US006269403B1

(12) United States Patent
Anders

(10) Patent No.: US 6,269,403 B1
(45) Date of Patent: *Jul. 31, 2001

(54) BROWSER AND PUBLISHER FOR MULTIMEDIA OBJECT STORAGE, RETRIEVAL AND TRANSFER

(75) Inventor: Mark Anders, Bellevue, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,065

(22) Filed: Jun. 30, 1997

(51) Int. Cl.[7] .................................................. H04H 12/18
(52) U.S. Cl. ............................................ 709/231; 709/219
(58) Field of Search .................. 707/9, 522; 395/200.58, 395/200.36, 200.77, 806, 610, 770; 345/302, 332; 370/94.1; 711/5; 364/512; 348/441, 7, 585; 371/40.18; 709/219, 231

(56) References Cited

U.S. PATENT DOCUMENTS

| Re. 35,029 | 8/1995 | Sandor et al. ........................... 355/22 |
|---|---|---|
| 4,498,079 | 2/1985 | Ghosh et al. ........................... 340/725 |
| 5,327,559 | 7/1994 | Priven et al. ........................... 395/700 |
| 5,421,012 | 5/1995 | Khoyi et al. ........................... 395/650 |
| 5,481,543 * | 1/1996 | Veltman ............................... 370/94.1 |
| 5,487,167 | 1/1996 | Dinallo et al. ........................ 395/650 |
| 5,513,305 | 4/1996 | Maghbouleh ........................ 395/145 |
| 5,577,258 | 11/1996 | Cruz et al. ............................ 395/800 |
| 5,594,911 | 1/1997 | Cruz et al. ............................ 395/800 |
| 5,598,566 * | 1/1997 | Pascucci et al. ...................... 395/770 |
| 5,613,057 * | 3/1997 | Caravel ................................. 395/806 |
| 5,657,096 * | 8/1997 | Lukacs ................................. 348/585 |
| 5,706,502 * | 1/1998 | Foley et al. ........................... 395/610 |
| 5,754,242 * | 5/1998 | Ohkami ................................ 348/441 |
| 5,754,566 * | 5/1998 | Christopherson et al. ........ 371/40.18 |
| 5,764,241 * | 6/1998 | Elliott et al. .......................... 345/473 |

(List continued on next page.)

OTHER PUBLICATIONS

Bryan, Document Markup for Open Information Interchange.IEEE, 1994.*
McGowanhttp://think.atr.net/mirror/faq/rt.../AVI_Graphics_Format_Overview.html, Mar. 29, 1997.*
Mark R.Brown et al. Special Edition Using Netscape 3, 1996.*
Lemay, L., In: Teach Yourself Web Publishing with HTML 3.2 In a Week, Third Edition, Sams.net Publishing, Indianapolis, IN, 109–148, (1996).
Zellweger, P. T., et al., "Fluid Links for Informed and Incremental Link Transitions", *Proceedings of Hypertext '98,*, Pittsburgh, PA, pp. 1–8, (1998).

*Primary Examiner*—Robert B. Harrell
*Assistant Examiner*—Thong Vu
(74) *Attorney, Agent, or Firm*—Schwegman, Lundberg, Woessner & Kluth, P.A.

(57) ABSTRACT

In a computer environment, a browser and publisher capable of exchanging multimedia objects provided in a new storage and delivery data format that increases performance and improves the user experience by reducing the transactions needed to retrieve a set of n objects from n to 1. The object data is interleaved with data definition entries identifying respective object data into a data format comprising a single stream for storage and/or delivery. The data format eliminates the need for multiple, asynchronous transactions thus reducing latency in the data transfer process. Moreover, the data format allows for optimization of how the object data is prioritized and interleaved to achieve desired performance objectives upon delivery of the multimedia objects for display using the browser.

86 Claims, 17 Drawing Sheets

U.S. PATENT DOCUMENTS

| | | | |
|---|---|---|---|
| 5,778,372 | 7/1998 | Cordell et al. | 707/100 |
| 5,784,056 * | 7/1998 | Nielsen | 345/332 |
| 5,787,454 * | 7/1998 | Rohlman | 711/5 |
| 5,860,073 * | 1/1999 | Ferrel et al. | 707/522 |
| 5,877,966 * | 3/1999 | Morris et al. | 364/512 |
| 5,892,909 | 4/1999 | Grasso et al. | 395/200.31 |
| 5,907,837 | 5/1999 | Ferrel et al. | 707/3 |
| 5,968,119 * | 10/1999 | Stedman et al. | 709/219 |
| 6,008,820 | 12/1999 | Chauvin et al. | 345/502 |
| 6,016,158 * | 1/2000 | MacKinnon | 348/7 |
| 6,065,058 * | 5/2000 | Hailpern et al. | 709/231 |

* cited by examiner

```
              ┌─ 110
GET/jamhome.htm  HTTP/1.0
Accept:text/plain
Accept: text/html
Accept: */*
User-Agent: Mozilla/2.0
```

FIG. 2

| | |
|---|---|
| HTTP/1.0  200  OK | 132 |
| Server: Microsoft-PWS-95/2.0<br>MIME-version 1.0 | 134 |
| Content-type: text/html | 136 |
| Last-Modified: Sun Feb 11 11:27:31 1996 | |
| Content-Length: 1463 | 138 |
| <HTML><br><HEAD>...<br>  (Rest of HTML document)<br>...</HTML> | 140 |

```
<HTML>
<HEAD>
<TITLE>Untitled</TITLE>
</HEAD>
<BODY BACKGROUND="Images/watermrk.gif">   142
<H1><CENTER><FONT SIZE=7 COLOR=#000000 FACE="Arial">
Jammer Home Page</FONT><FONT SIZE=7 COLOR=#000000>
</FONT></CENTER></H1>
<P>
<CENTER><IMG SRC="Images/underconstruct.gif" ALIGN="ABSMIDDLE">   144
</CENTER>
<P>
<TABLE >
<TR><TD WIDTH=294><IMG SRC="Images/istudio.gif"></B></TD>   146
<TD WIDTH=294><B><FONT COLOR=#FF00FF FACE="Arial">
Welcome to the <I><B>Jammer</B></I><b> Home Page! Jammer is a simple
way to control how Web media moves from the server to the client, and
improve both performance, and the user experience. </B></FONT></B>
</TD></TR>
</TABLE>
<P>
<BR>
<FONT SIZE=2 FACE="Arial">This paper describes a new storage and
delivery strategy for multi-media object sets for high latency
environments such as the World Wide Web. It increases performance,
and improves the user experience, by reducing the number of transactions
to retrieve a set of <I>n</I> objects, from <I>n</I> to 1, without
compromising the ability of the viewer to progressively render
pieces of the objects. Jammer accomplishes this by storing sets
of objects in a single file (or storage unit), and arranging the
object's data in an optimized <I>interleaved</I> format, so that
the file image when stored on the server is identical to, or better
than, how the objects arrive on the client machine as the result
of multiple requests.   </FONT>
<P>
</BODY>
</HTML>
```

141

BROWSER AND PUBLISHER FOR MULTIMEDIA OBJECT STORAGE, RETRIEVAL AND TRANSFER

BACKGROUND OF THE INVENTION

1. Field of the Invention

The present invention relates to multimedia systems, and more particularly, to a storage and delivery system for multimedia objects in a computer environment, such as the World Wide Web.

2. Description of Related Technology

The World Wide Web (Web) is part of a global computer network known as the Internet. Scientists and academicians initially developed and used the Internet to share information and collaborate. The Web functions as an object based multimedia system. It allows for the creation, storage and delivery of multimedia objects. Recently, on-line service providers, such as Microsoft Network, CompuServe, Prodigy and America Online, have linked to the Web. This enables their customers to access a variety of information and communication services available from independent content providers and other Web users. For example, a typical customer can access electronic mail, news services, weather services, bulletin board services and travel services on the Web.

Independent content providers typically create pages to communicate information and services they provide for their Web customers. A customer views a page on a computer screen using a Web browser, such as Microsoft Explorer or Netscape Navigator, installed on the computer. The structure and appearance of a Web page are defined using HyperText Markup Language (HTML). The browser retrieves and interprets the HTML defining a page to display it on a user's computer screen. A typical Web page may have multiple objects including HTML text, a background image, icons, audio and bitmaps for several images.

A Web browser accesses a page when a user enters a Universal Resource Locator (URL) or selects a link to a page's URL using a pointing device such as a mouse or glide pad. The browser retrieves the page by first checking its cache of previously retrieved objects. In this context, a cache is a collection of previously requested objects that a browser maintains in local storage on the user's computer. If the requested object data exists in cache, the browser fetches the object from the cache. Otherwise, the browser must retrieve the object from a remote computer over the Web. Data transfer over the Web is a very slow process when compared to retrieving the same object from a cache on the local disk of the user's computer.

Data transfer speed is basically the result of the bandwidth and latency of a connection. Bandwidth is the speed with which data moves over a connection. Improved bandwidth results by increased carrier capacity and/or increased transmission speed over the carrier. For example, a user can increase the bandwidth of a Web connection over an analog phone line carrier by increasing the modem transmission speed from 14,400 bits per second to 28,800 bits per second. A user may similarly increase the bandwidth of a Web connection by using a digital phone line carrier, such as an Integrated Services Digital Network (ISDN) line, capable of carrying two data channels each at 64,000 bits per second. Latency refers to the delay between the time a request for data is made and the time that the data is received. It results from the logistics of establishing and maintaining a connection over a carrier involving various types of handshakes needed to initiate and complete data transfer. Thus, latency is usually independent of the size of the data being sent over the carrier.

Data transfers over the Web conform to the HyperText Transfer Protocol (HTTP). HTTP manages connections between those who request information, clients, and those who provide information, servers. In the HTTP model, a client establishes a connection to a remote server and then issues a request. The server processes the request, returns a response and closes the connection. Importantly, the HTTP model only permits a single transaction per connection. In addition, HTTP uses the Transmission Control Protocol (TCP) as a transport layer. A transport layer is a mechanism for the transfer of data between clients and servers that ensures delivery of in sequence, error-free data with no losses or duplications. TCP establishes connections using a three-part handshake as follows: the client sends a connection request, the server responds and the client acknowledges the response, at which time the client can also send data.

Certain design features of HTTP interact poorly with TCP causing problems with data transfer performance. Opening a connection to a server creates a latency of at least two round trips over the network because a client must wait for a server to send its connection response. Similarly, TCP uses a mechanism called slow start to negotiate the data transfer speed over a connection. To prevent overrunning a receiving computer, slow start initiates transfer at a low data transfer rate and progressively increases the data transfer rate as more chunks of data are received successfully. When transferring large amounts of data over a single connection, the impact of slow start and connection latency are minimal. However, when transferring small amounts of data over a large number of connections, the impact of slow start and latency from multiple connections is devastating.

In the early days of the Web, cumulative delays from slow start and connection latency were tolerable because early Web pages included a single HTML page with one or two images. However, the complexity of Web pages is increasing. Modem Web page designs include more objects, such as bitmaps, audio, ActiveX controls and Java Applets, and thus HTTP requires numerous transactions to transfer each page over the Web. Thus, the cumulative latency due to TCP handshaking and slow start becomes a substantial performance limitation. Moreover, a HTML page includes the names of referenced objects and a browser cannot request these referenced objects until it has retrieved and interpreted the HTML defining the page. Thus, the latency of retrieving the HTML defining a page can create a cascade of delays in requesting embedded objects. Cascaded round trip delays from opening multiple server connections to retrieve embedded objects and subsequent slow start delays often result in situations where users can do no useful work because the system is waiting instead of transmitting data.

Lastly, numerous HTTP transactions severely impact the data transfer performance of high-speed satellite and cable modem systems. In these systems, the transmission speed from a server to a client, the "downstream" connection, is substantially higher than the transmission speed from client to server, the "upstream" connection. For example, wireless satellite links and cable modems are capable of transmitting data "downstream" at 10,000,000 bits/second rate while transmission of "upstream" browser requests often occurs at a rate of 768,000 bits/second (a "fractional" T1 connection, about 13 times slower). For a Web page having numerous objects, the slow speed "upstream" request connection limits data transfer performance due to the response latency of multiple HTTP requests for these objects.

SUMMARY OF THE INVENTION

The present invention addresses these performance limitations by improving the efficiency of object retrieval and transfer in multimedia computer environments. In contrast to the multiple transactions currently required to retrieve multiple objects in HTTP, the present invention reduces the number of transactions to retrieve a set of n objects from n to 1, thereby substantially reducing the latency due to slow start and cascaded round trip delays from opening multiple server connections. This increases delivery performance and improves the user experience by substantially reducing the delays in the transfer and rendering of images on the user's display.

The present invention includes data for multiple objects in a single data stream in an optimized interleaved format. A publisher stores and delivers object data interleaved with data definition entries identifying respective object data in a data format comprising a single stream. This data format eliminates the need for multiple, asynchronous transactions. Moreover, the publisher enables one to customize and optimize how the object data is prioritized and interleaved by defining a configuration template. A browser recognizes a data stream prepared in the data format of the present invention and unpacks the data stream customized by the publisher to achieve a desired effect on the viewer upon delivery of the multimedia data. The browser of the present invention also supports data transfer using conventional methods and data formats.

One aspect of the present invention includes a publisher for storing and transmitting a stream of objects in a computer environment, each object in the stream having object data packets, comprising a stream configurator producing a template providing an order in which to display each of the objects in the stream, a data definition generator providing at least one data definition entry corresponding to each object in the template and an interleavor assembling the stream by interleaving the object data packets and the data definition entries according to the order provided in the template, wherein the at least one data definition entry is interleaved with the object data packets such that the data definition entry corresponding to one of the objects in the stream precedes any object data packets of the one object in the stream.

Another aspect of the present invention includes a browser for displaying an image on a display in a computer environment, the image represented by a stream of objects, each object in the stream having object data packets, comprising an unpacker receiving the stream, the stream having data definition entries interleaved with object data packets, the unpacker extracting the object data packets from the stream with reference to the data definition entries, an unpacker object cache (UOC) storing object data packets provided by the unpacker, the UOC organizing the object data packets according to the corresponding data definition entry for each object in the stream and at least one data handler interpreting object data packets selected by the unpacker so that the interpreted object data packets can be rendered on the display.

Yet another aspect of the invention includes a method of forming a stream from a page having a plurality of objects in a computer environment, each object having object data packets, comprising the steps of creating data definition entries corresponding to the objects in the page and interleaving the data definition entries with the object data packets so as to form the stream, wherein the data definition entry corresponding to one of the objects in the page precedes any object data packets of the one object.

Lastly, yet another aspect of the present invention includes a method of displaying a page having a plurality of objects in a computer environment, each object having object data packets, comprising the steps of receiving a stream having data definition entries interleaved with object data packets corresponding to each of the plurality of objects, unpacking said object data packets from said stream with reference to said data definition entries and displaying data representing said object data packets on a viewing device.

BRIEF DESCRIPTION OF THE DRAWINGS

FIG. 2 is an HTTP Get command for retrieving a file from a server.

FIG. 3 is an HTTP response header resulting from the HTTP Get command of FIG. 2.

FIG. 4 is the HTML code defining the Web page design of FIG. 1b.

DETAILED DESCRIPTION OF THE PREFERRED EMBODIMENTS

The following detailed description of the preferred embodiments presents a description of certain specific embodiments to assist in understanding the claims. However, one may practice the present invention in a multitude of different embodiments as defined and covered by the claims.

For convenience, the description comprises four sections: Object Retrieval Overview; the Jammer Data Format; Data Storage, Retrieval and Transfer Systems; and Summary. The first section provides an overview of object retrieval in the current Web environment, the following two sections describe the Jammer data format and preferred embodiments for practicing the Jammer data format of the present invention, and the remaining section summarizes advantageous features of the present invention.

I. Object Retrieval Overview

Figure 1A:
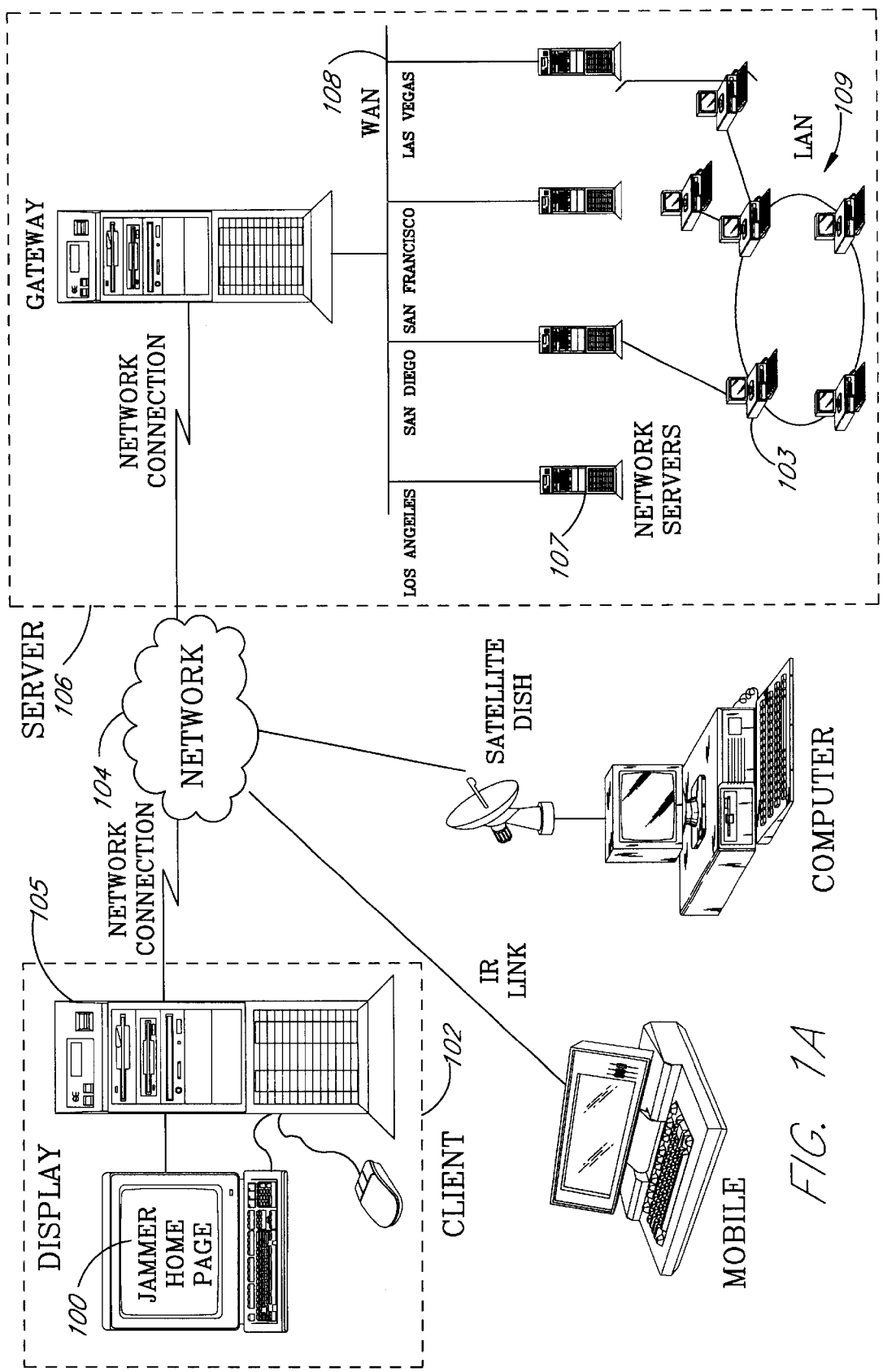
FIG. 1a is an example of a computer environment for displaying a typical Web page design of the present invention.
Figure 1B:
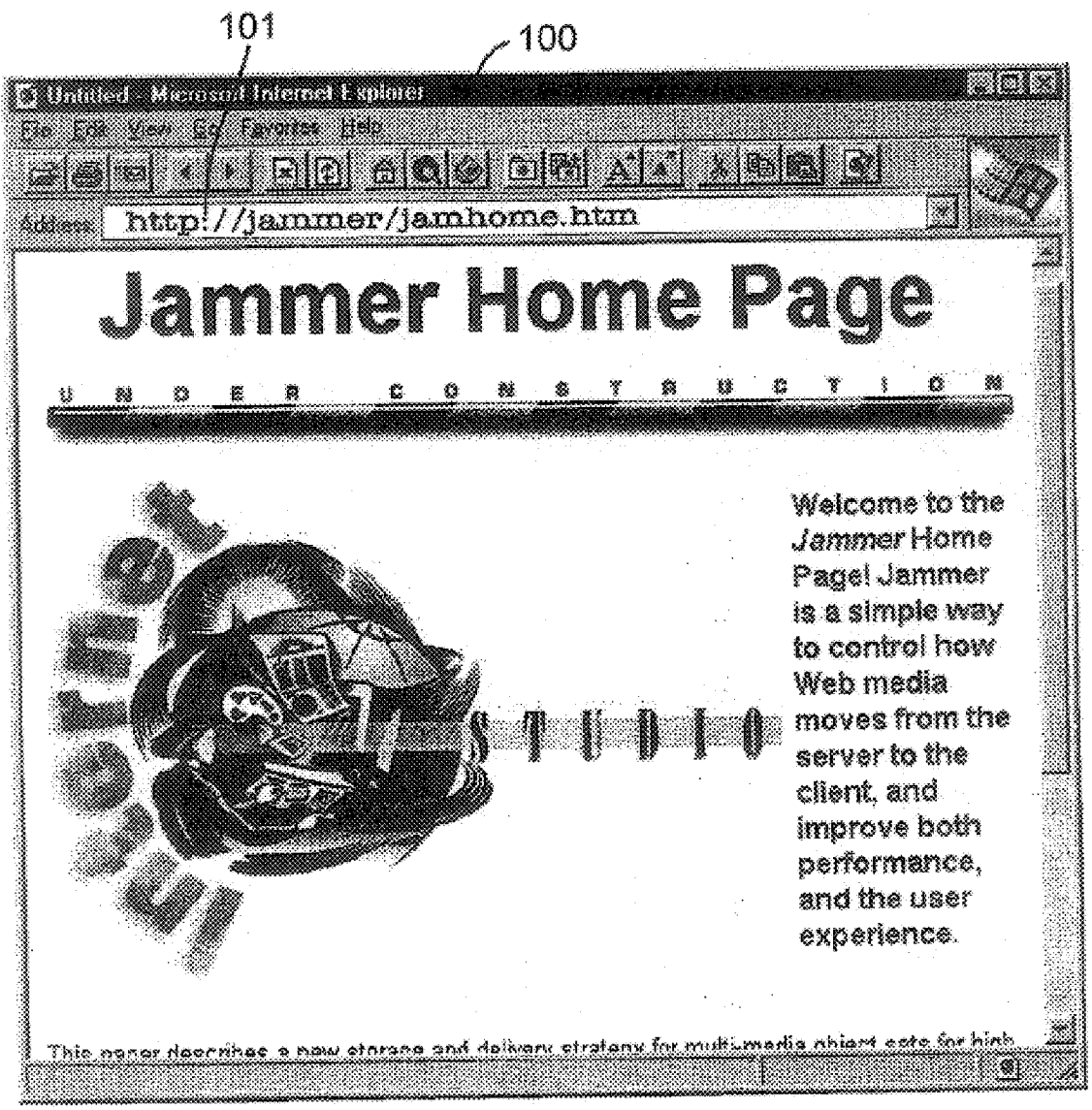
FIG. 1b is a typical Web page design as viewed on the visual display of a client computer.
Figure 5A:
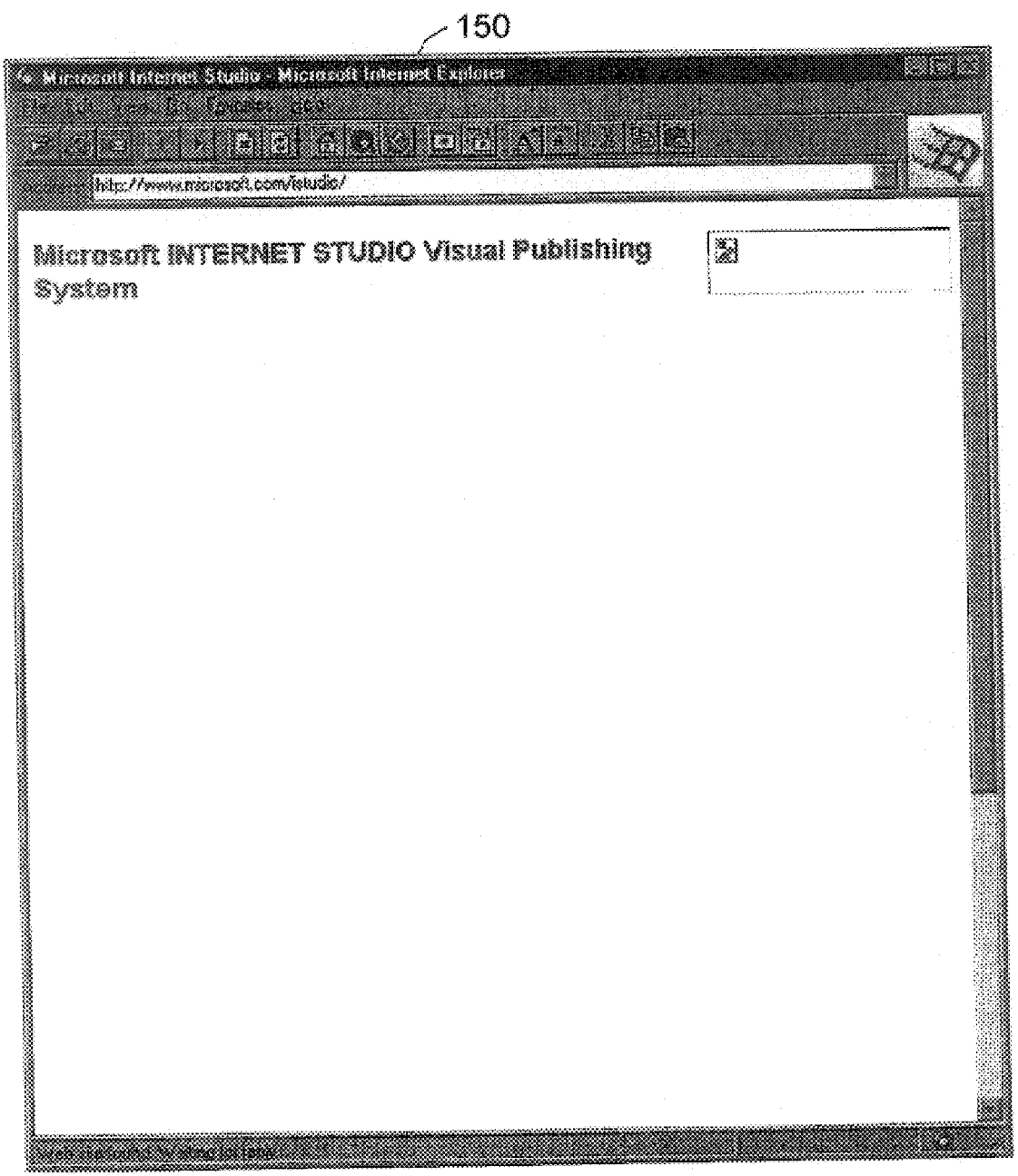
FIGS. 5A–5E comprise a sequence of displays for the Web page design of FIG. 1b as it undergoes progressive rendering.
Figure 5B:
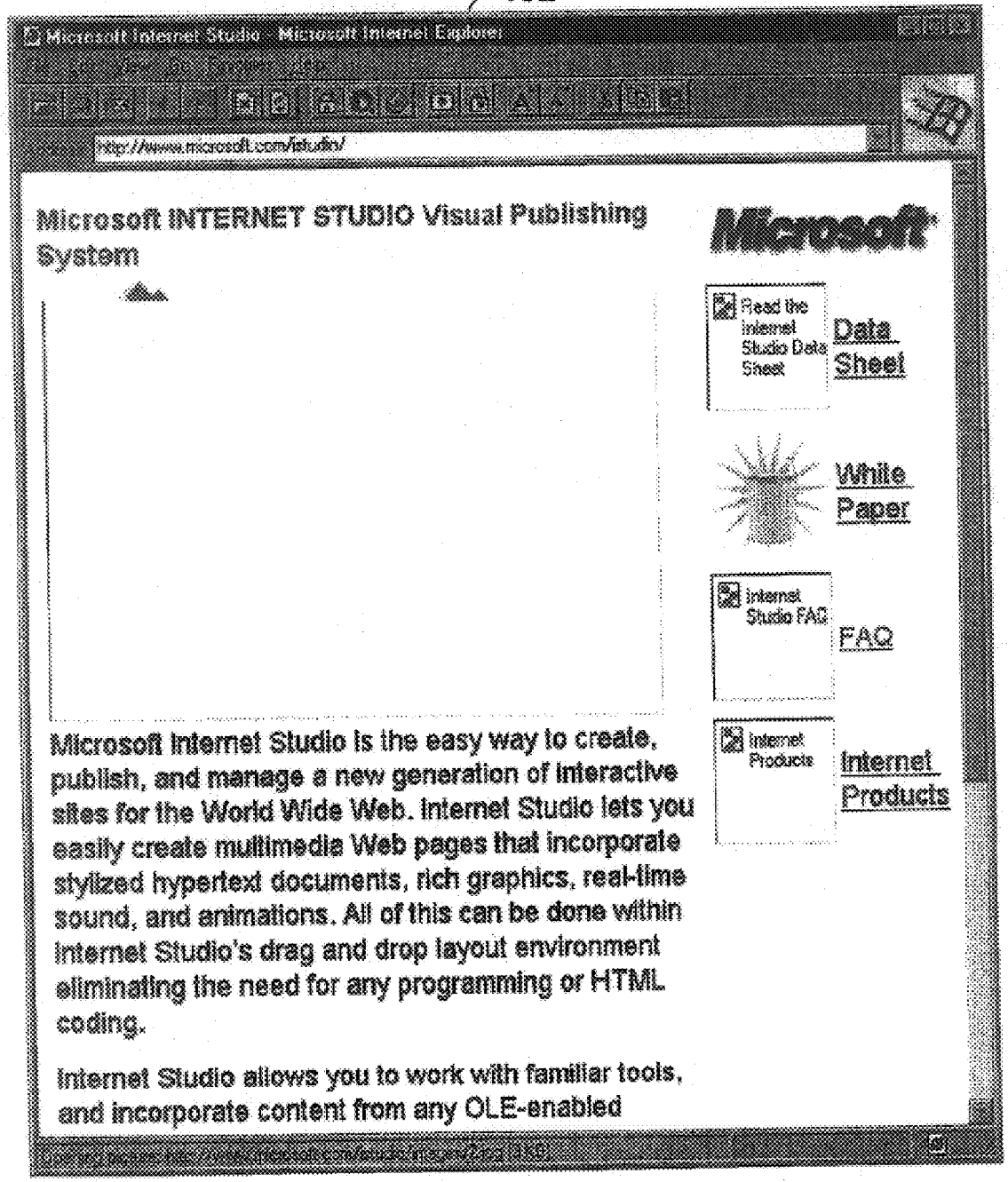
Figure 5C:
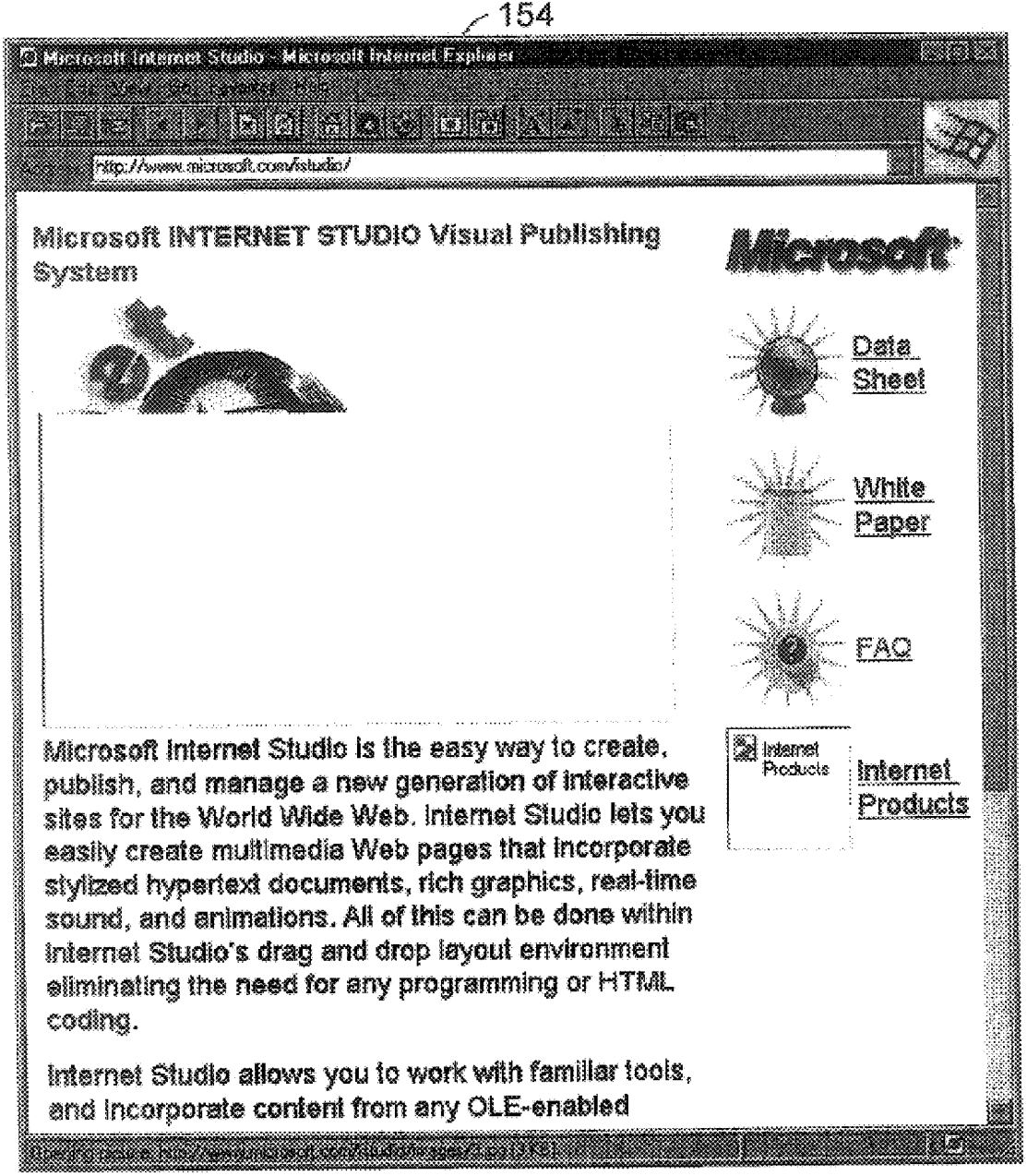
Figure 5D:
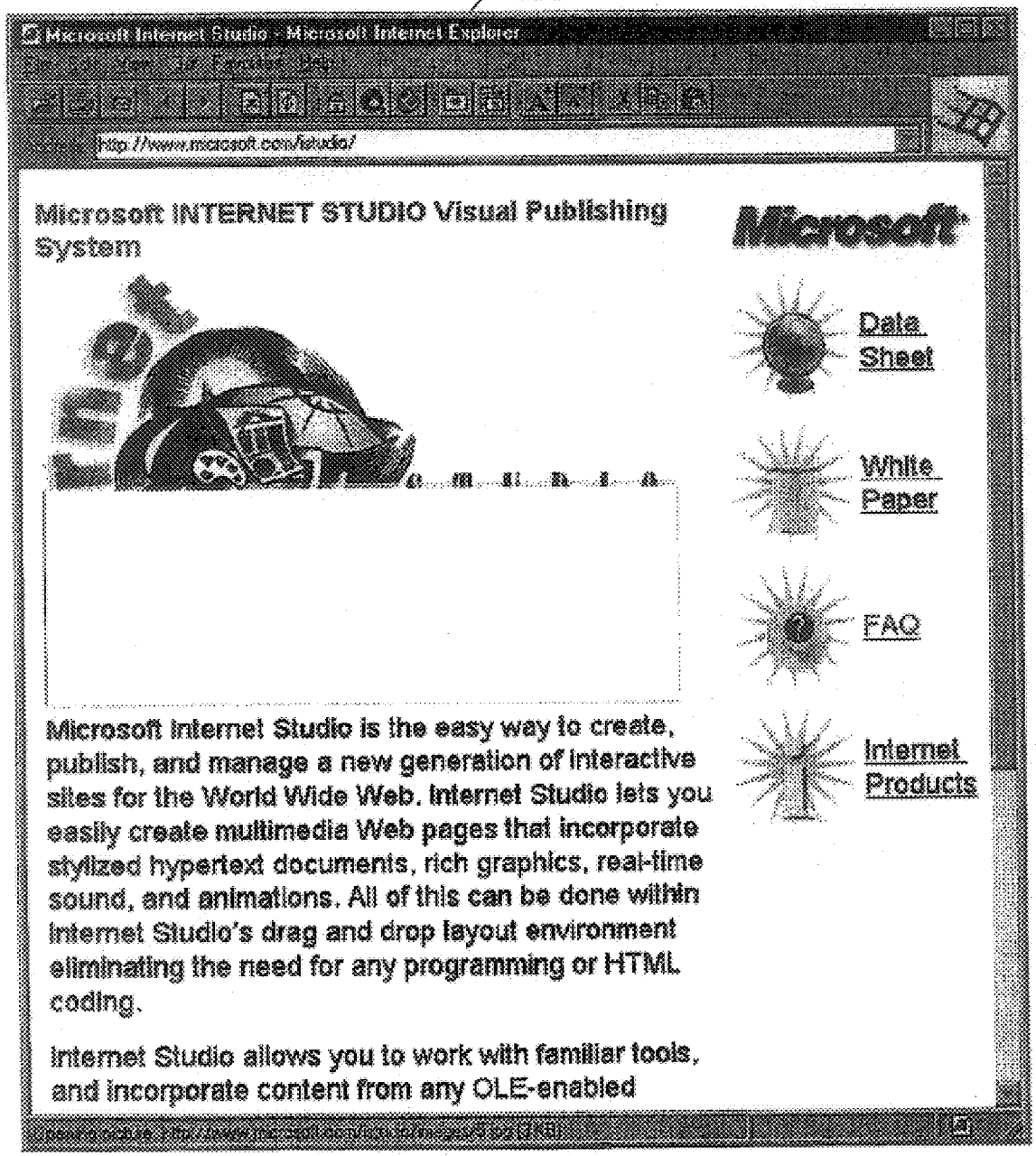
Figure 5E:
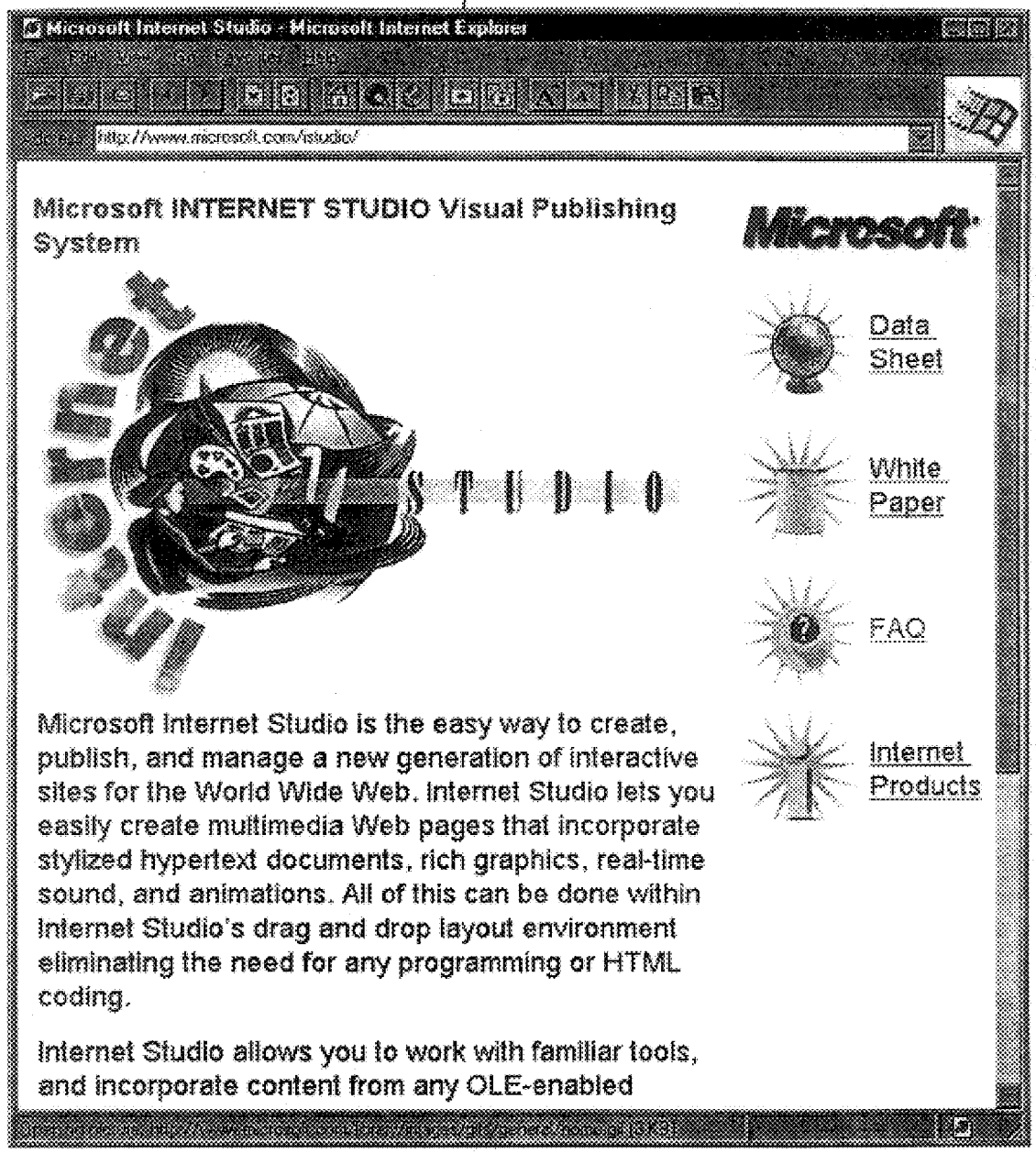

FIG. 1a is an example of a computer environment for practicing the present invention. A client 102 communicates with a server 106 by means of a network 104, such as the World Wide Web. The server 106 may include a gateway to a Wide Area Network (WAN) 108 having a plurality of Local Area Networks (LANs) 109. A browser 103, residing on a client 102, displays a page design for a Jammer home page 100 (FIG. 1b) on the World Wide Web. A user can view this page by entering, or selecting a link to, the URL 101 "http://jammer/jamhome.htm" in a browser, such as Microsoft Explorer or Netscape Navigator, executing on the user's computer. The URL 101 (FIG. 1b) for the Jammer home page informs the browser to obtain the file jamhome.htm from the jammer server. The file jamhome.htm is the base object defining the Jammer home page. To display this page, a browser 103 hierarchically retrieves objects comprising the page. The browser 103 first retrieves a base object having HTML defining the page. To obtain the base object, the browser 103 first opens a network connection to an HTTP server named jammer. Referring now to FIG. 2, the browser then sends an HTTP Get command 110 to the jammer server for a document named jamhome.htm. In response, the jammer server locates and sends the jamhome.htm document to the client 102 using the HTTP response format shown in FIG. 3. The HTTP response format includes a header 130 followed by object data 140 of the requested document.

Referring to FIG. 3, the header 130 comprises items designed to provide the browser with information regarding the server, its capabilities, the status of the response and properties of the data returned. The first header item 132 identifies the protocol version and status code. For example, data returned for jamhome.htm is in HTTP version 1.0 format and a "200 OK" return code indicates that the server carried out this request successfully. The second header item 134 notifies the browser of the server type and identifies the data encoding used. For example, the jammer server is Microsoft-PWS95/2.0 compatible and transfers data encoded using Multipurpose Internet Mail Extensions (MIME) version 1.0. The next header items 136 inform the browser of the content data type and the last modification date for the data. For example, jamhome.htm is HTML text and the last modification to the text occurred on Sunday, February 11. Finally, the remaining header item 138 notifies the browser of the amount of data transferred. For example, the jamhome.htm file contains 1463 bytes of data.

The browser checks the HTTP header 130 to determine if its request was successful and to identify the received document type and the amount of object data. The browser then removes the HTTP header 130 and places the object data 140 in a cache for quick access at a later time. The browser then identifies the object data type and begins to process the data. For example, the HTTP header 130 indicates that the object data 140 is of the type HTML. The browser thus invokes its HTML handler to display the text and to parse through the HTML object data 140 to find references to other objects on the page. Referring now to FIG. 4, the HTML base object 141 for the Jammer home page 100 contains references to three embedded image objects stored on the jammer server: a background image 142, an under construction image 144 and an Internet Studio image 146. To assemble and display a page such as the Jammer home page 100 of FIG. 1, the browser must retrieve all objects referenced within the retrieved HTML base object.

As the browser parses through the HTML base object 141 to locate references to embedded objects, it proceeds through the same steps to retrieve the embedded object data. For each reference to an embedded object, the browser first checks its cache to determine if the object data resides in cache. If so, the browser retrieves the object data from cache. Otherwise, the browser opens a connection to the server having the object data and transmits an HTTP Get command to retrieve the object data. The server in turn responds with an HTTP response header with information regarding the server, its capabilities, the status of the response and properties of the object data returned. Note that the embedded objects 142, 144, 146 referenced in FIG. 4 are of the GIF data type so the browser must invoke its GIF handler to process the object data.

The browser may also request multiple objects simultaneously. To do this, the browser issues multiple requests to the server, each request requiring a separate connection to the server. The browser then processes the data for each object as it arrives from the server. Using a technique called progressive rendering, the browser draws partial objects on the display as data for each of the multiple objects arrives from the server. The result is that a user views the page as the browser progressively assembles it. This is important since a progressive rendering browser maintains a user's interest despite delays caused by moving large objects over a low-bandwidth connection. Furthermore, the user can interact with those portions of the page already displayed without having to wait for the remaining portions to arrive. FIGS. 5A–5E illustrate a sequence of displays 150 (FIG. 5A), 152 (FIG. 5B), 154 (FIG. 5C), 156 (FIG. 5D), 158 (FIG. 5E) for the Jammer home page 100 of FIG. 1 as it undergoes progressive rendering. To support progressive rendering, the browser interprets HTML commands from the base object as it arrives from the server. Upon locating a reference to an embedded object such as image object 142 of FIG. 4, the browser dispatches a request for its object data. Thus, it is possible to have multiple overlapping object data transfers from the server to the browser while the browser is still parsing and interpreting HTML from the base object defining the page.

Figure 6:
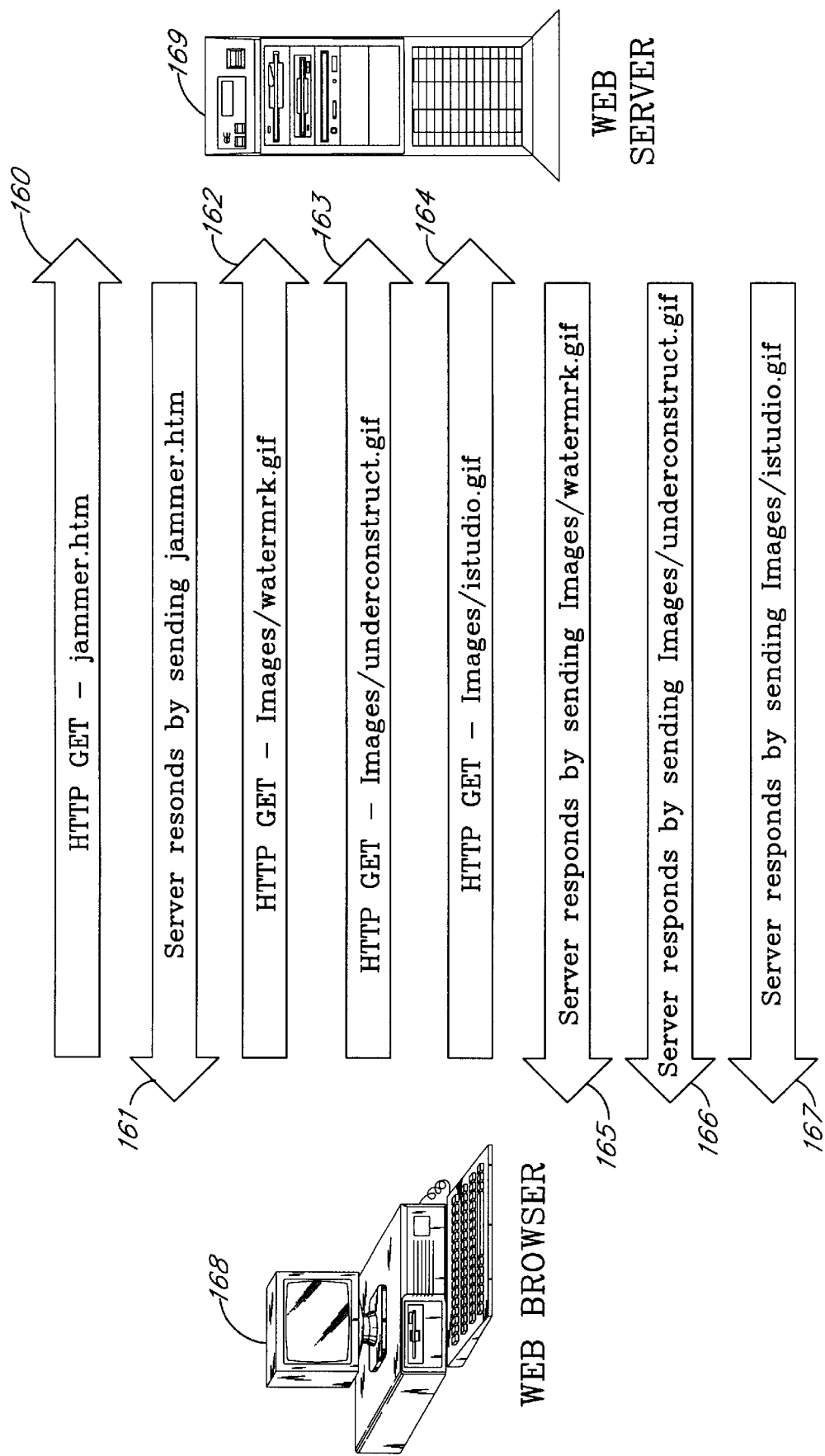
FIG. 6 illustrates a sequence of browser requests and server responses for a progressively rendered Web page, such as shown in FIG. 1b.

FIG. 6 illustrates a sequence of overlapping transactions needed to progressively render the Jammer home page 100 of FIG. 1. The first transaction 160, a get request, initiates transfer of the base object, jamhome.htm, from the server 169 to the browser 168. In the next transaction 161, the server 169 responds by serially transmitting HTML from the jamhome.htm file. As the browser 168 interprets the HTML, it finds a reference to the background image object 142 and initiates the next transaction 162, a corresponding get request for the watermark.gif file. The server 169 continues to serially transmit HTML from the jamhome.htm file while it locates and prepares the watermark.gif file for transfer. The browser 168 then finds a reference to the under construction image object 144 and initiates another transaction 163, a get request for the underconstruction.gif file. The server 169 continues to serially transmit HTML from the jamhome. htm file while it now locates and prepares both the watermark.gif and underconstruction.gif files for transfer. The browser 168 now locates a reference to the Internet Studio image object 146 and initiates transaction 164, a get request for the istudio.gif file. The server 169 then transfers object data for watermark.gif 165, underconstruction.gif 166 and istudio.gif 167.

An HTTP server, such as server 169 of FIG. 6, can receive multiple requests from a single browser, such as browser 168, as well as multiple requests from multiple browsers. The server 169 can handle multiple transactions simultaneously using the multitasking services provided by its operating system. These multitasking services allow a server to create and coordinate the execution of objects, or tasks. The operating system allocates a small time slice for each task to run. Because these time slices are very small, the operating system switches between them rapidly to create the impression that multiple tasks are executing simultaneously. However, in reality, the operating system executes small portions of each task sequentially. Although the operating system executes the instructions for each task in the correct order, the actual instructions executed by the operating system across all of its tasks includes small portions of each task interleaved in an essentially random order. Multitasking facilities differ between operating systems. For example, in the Unix operating system, a server spawns multiple processes (i.e., tasks), each to handle a single transaction. Under Windows 95 and Windows NT, both licensed by Microsoft, a server uses multiple threads, with each thread handling a transaction. For Unix, Windows 95 or Windows NT, each thread or process is responsible for retrieving the requested data from a disk, database, executable code or other process, formatting the data for transmission over the network, encoding the data according to the selected method, and sending it to a client's browser by writing the formatted, encoded data to the network connection opened by the client.

Figure 7:
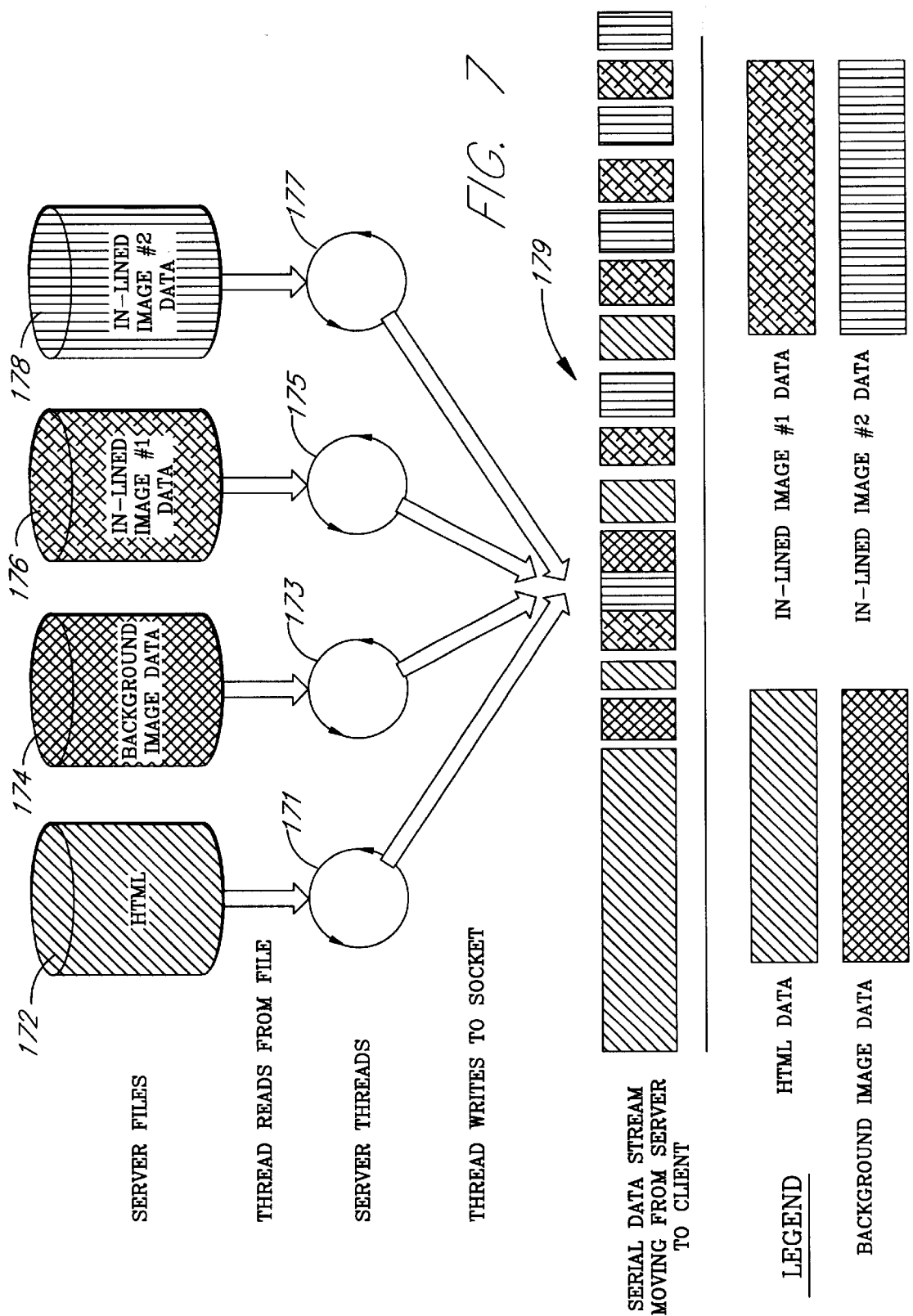
FIG. 7 is a block diagram of a serial data stream created from multiple, overlapping object requests serviced by a multitasking server.

Referring now to FIG. 7, a multitasking server transfers a serial data stream 179 over the Web for progressive rendering on a client. Each time the browser issues a request to the server to retrieve an object, the server creates a task to handle the transaction. As shown in FIG. 7, a HTML thread 171 retrieves, formats and transmits HTML data 172 while a background image thread 173 retrieves object data for a background image 174, a first image thread 175 retrieves object data for a first image 176 and a second image thread 177 retrieves object data for a second image 178. As each of these threads 171, 173, 175, 177 executes during its time slice, it retrieves, formats and transmits a data fragment to the client. Note that the formatting operation includes insertion of an HTTP header in each of the data fragments resulting from execution of the thread 171, 173, 175, 177. Due to time sliced multitasking, data fragments having small portions of the object data for each of these four objects are interspersed to form the serial data stream 179. The interspersed stream enables a progressively rendering browser to display the data fragments as they arrive. Thus, although a single thread, such as the HTML thread 171, transmits data packets in the correct order, the order of the data packets in the serial data stream 179 is essentially random. This is a result of multitasking as the initiation and completion of tasks to request data, allocate threads and return data from each thread is also essentially random. Moreover, it is not possible to arrange delivery of data fragments in a selected order in these multitasking systems. Upon receipt of the data stream 179, the browser removes HTTP header information and progressively renders images from the data fragments of the respective object data transferred.

II. Jammer Data Format

A preferred embodiment of the present invention is a flexible data format that enables the combination of object data from multiple objects comprising a set of related objects, such as a HTML page having embedded images, into a single data stream. In this manner, a browser can retrieve all of the objects in a single request by receiving and processing the data stream as if multiple requests had been made. This flexible data format is advantageous because, unlike an HTTP extension or other protocol, it does not require changing existing HTTP infrastructure or protocols, such as firewalls and proxies. Likewise, the data format does not require changing how the browser works. Thus, one can implement the dat format by publishing data in the Jammer format on the server and unpacking a Jammer data stream using a proxy that understands the Jammer data format, and how to unpack it, on the client.

Figure 8:
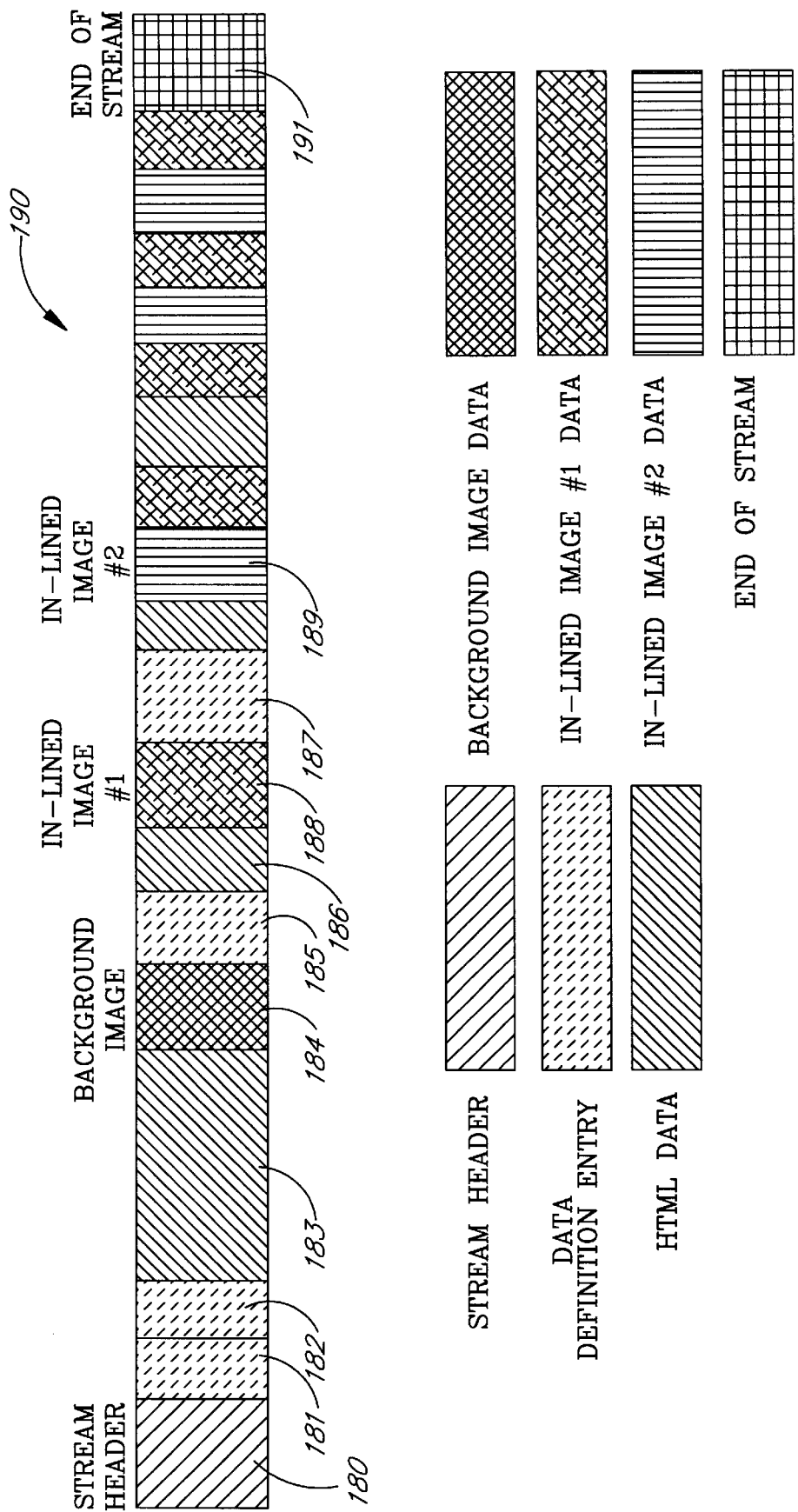
FIG. 8 is a data diagram showing the structure of a serial data stream prepared in the data format of the present invention.

Referring now to FIG. 8, a data stream 190 prepared according to an embodiment of the present invention is illustrated. The data stream 190 includes a general purpose Stream Header 180 followed by a series of interleaved records of two types: Data Definition Entries and Data Packets. The Stream Header 180 provides information about how the server packed the data into the data stream 190. This includes the version number used to prepare the data stream 190, as well as optional entries to define the number of objects in the data stream 190 and the total size of the data stream 190. The Stream Header 180 is extensible and includes ASCII text with one header per line, similar in format to an HTTP header.

Figure 9:
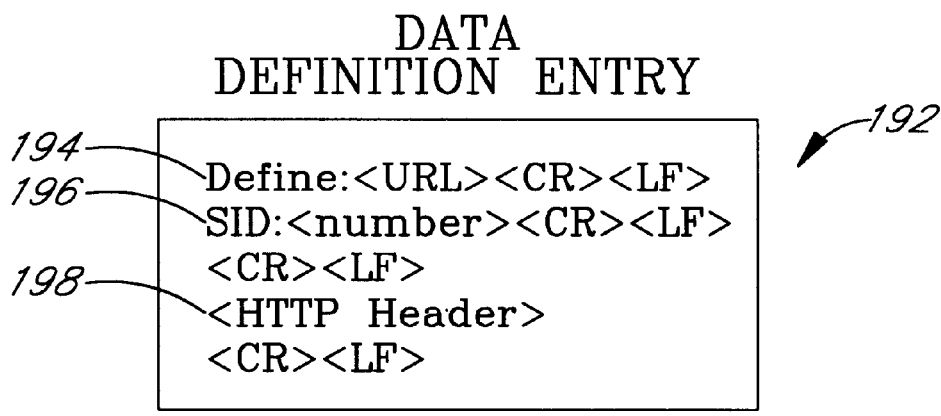
FIG. 9 is an example of a data definition entry of the present invention.
Figure 10:
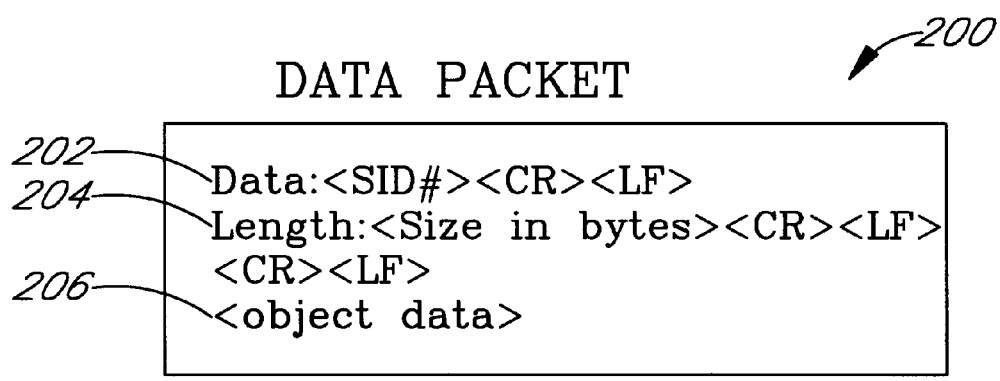
FIG. 10 is an example of a data packet of the present invention.

As shown in FIG. 9, a data definition entry 192 provides information about a single object that is present in the data stream 190. The data definition entry 192 is the first reference to an object having object data within the data stream 190. The data definition entry 192 includes information about the object, but no object data. The information typically includes an object identifier 194, such as its URL, a stream identifier number (SID) 196 to identify data packets belonging to the stream and other previously described HTTP header information 198, such as language encoding, content length of data and the date of last modification. As shown in FIG. 10, a data packet 200 comprises a SID 202, the number of bytes in the data packet 204 and object data 206. Note that a data packet does not have to include all of the object data for an object. Thus, in the Jammer data format, the contents of an object may be distributed among a plurality of data packets.

Referring back to FIG. 8, data stream 190 includes data packets for an HTML base object 183, 186, a background image object 184, a first image object 188 and a second image object 189. A data definition entry for an object must precede the first data packet for that object in the data stream 190. Additionally, the data definition entry for an object must precede any references to that object in the data packets for any other objects in the stream. For example, data definition entries, such as 181, 182, 185, 187 (FIG. 8) for embedded images (142, 144, 146) in the stream must precede references to those embedded images in the HTML base object (FIG. 4). The data definition entries facilitate unpacking of the data stream 190 because they define which objects are present in the data stream 190 and provide information about those objects. In this manner, data definition entries in the data stream 190 serve to notify a browser that unpacks the data stream of all objects present in the data stream. Moreover, the process of interleaving object data and data definition entries into a data stream 190 can occur either prior to or at the time the server sends data to the browser. Thus, for Web pages including a static set of objects, the server may create and store a data stream 190 prior to the time a browser requests the page. Similarly, for Web pages including objects having frequently changing data, such as an object having the results of a database query, or for which an object set is dynamically created at the time of a browser request, the server creates and transmits a data stream 190 at the time of the browser request.

Furthermore, the data format of the present invention permits optimization of the sequence of object data records. By modifying the sequence of object data records in the data stream 190, it is possible to control how a page is displayed on a client's browser. As discussed previously, there is no particular order to the display of data fragments in current browsers supporting progressive rendering. When a request is made for an image, for example, a prior art browser waits for the data from the server and displays the data as it is received. In contrast, a browser of the present invention knows at the time an object is requested whether it is present in the data stream 190 because data definition entries for all objects present in the data stream 190 precede references to those objects. Thus, when an object is being requested, if a browser of the present invention has already determined from the data definition entries that the object is present in the stream, the browser displays the data packets of the object as they are received instead of initiating a get request for the object from the server. The present invention allows configuration of a data stream to have object data prioritized, so that the author of the page may control the order in which the browser actually receives object data. For example, the author of a page may desire that the browser display a particular advertising image first to ensure that a viewer sees the advertising before anything else. Similarly, the author may desire that a viewer sees all the embedded images on a page prior to the background image. The Jammer data format permits the author to select the sequence of delivery and display of object data to create a desired effect on the viewer.

Figure 13:
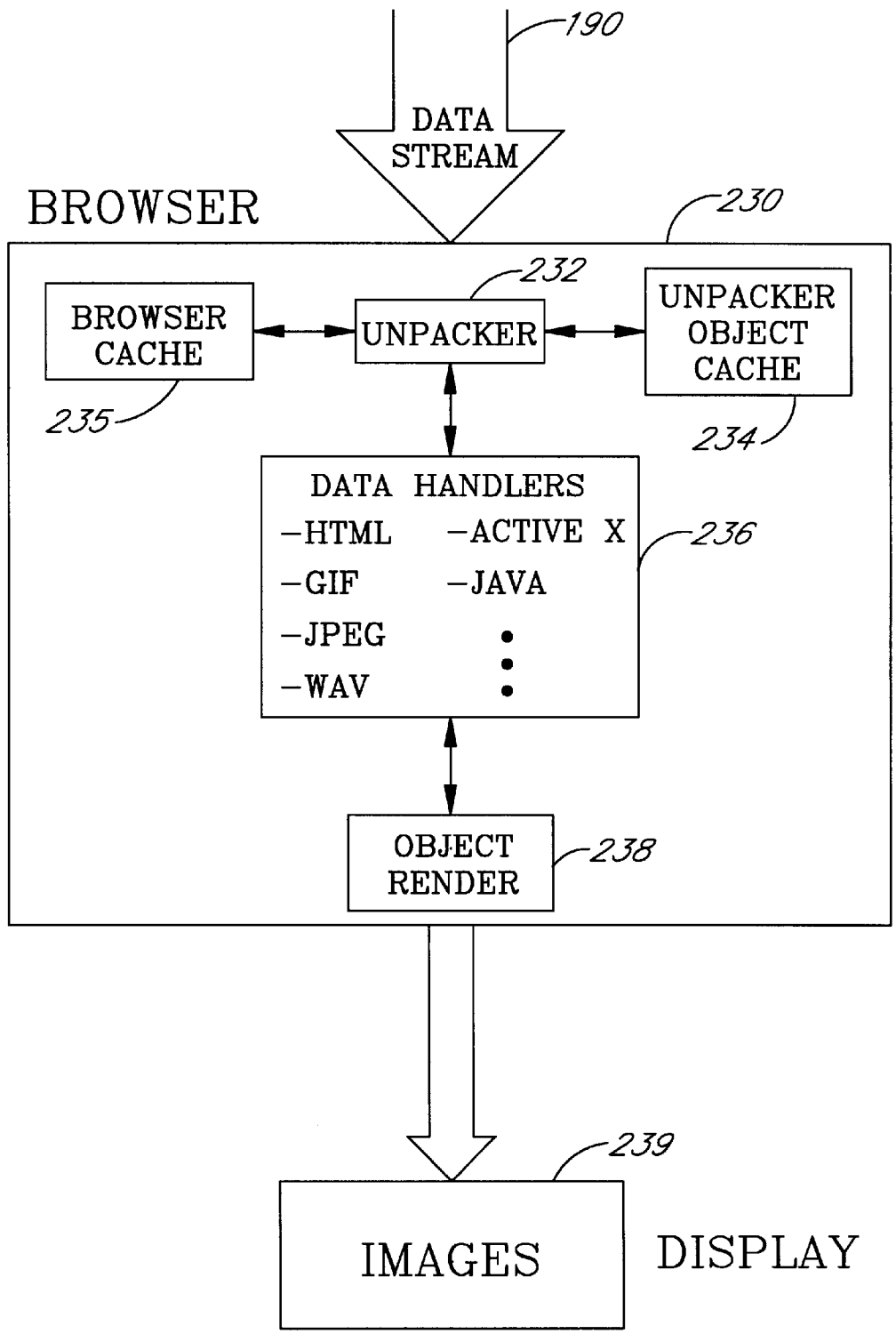
FIG. 13 is a block diagram of a browser supporting the data format of the present invention.

The process of unpacking the data stream 190 shown in FIG. 8 occurs as follows. Upon request for the base object, the server returns the data stream 190. As the browser receives the data stream 190, it interprets the stream header 180, recognizes that the data to follow is in the Jammer data format and then begins to unpack the data stream 190. A first data definition entry 181 follows the stream header 180 and provides the browser with information about the base object. A second data definition entry 182 having information on a background image follows the first data definition entry 181. The browser then reads the first data record 183 and recognizes HTML data. The browser invokes its HTML handler to parse and display data from the first data record 183. A second data record 184 follows in the data stream 190. Using information from the second data definition entry 182, the browser determines that data in the second data record 184 corresponds to the background image and reads this data into a cache 234 (FIG. 13).

Referring again to FIG. 8, the following record in the data stream 190 is a third data definition entry 185. The third data definition entry 185 provides the browser with information on a first image object for later use. The next record in the data stream 190 is additional HTML data 186 from the base object. In parsing this additional HTML data 186, the HTML handler finds a reference to the background image and issues a request for it. The browser's cache manager receives the request for the background image data and returns the data for the background image it holds in cache for the second data record 184. In addition, the HTML handler finds a reference to the first image object while interpreting the additional HTML data 186. As no object data for the first image object exists in the data stream 190 up to this point, the browser dispatches a request for the first image object. The remainder of the data stream 190 includes a data definition entry for a second image object 187 as well as object data for the first image 188 and the second 189 image. Unpacking of the remaining records in data stream 190 proceeds by continuation of the method described above. Unpacking of the stream 190 terminates upon detection of an end of stream indicator 191.

III. Data Storage, Retrieval and Transfer Systems

Figure 11:
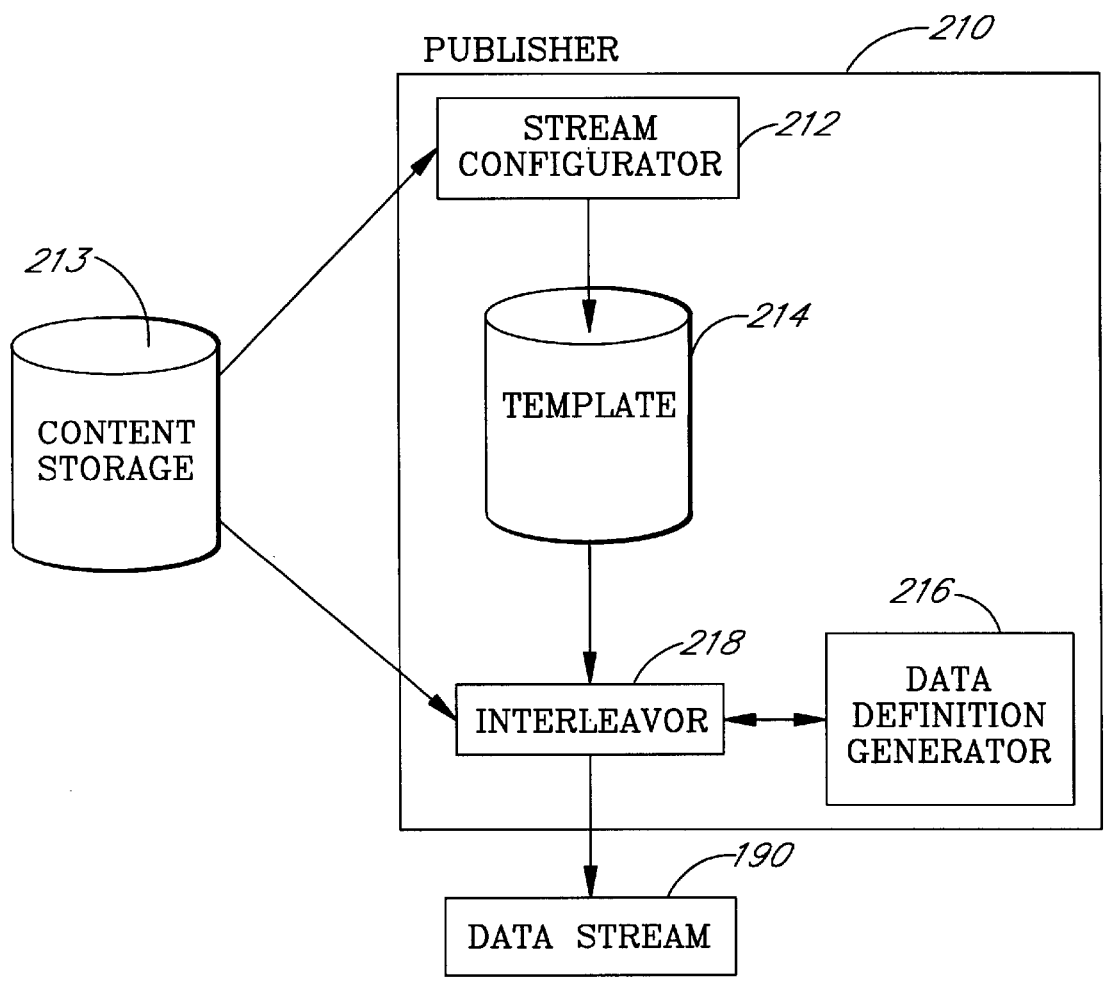
FIG. 11 is a block diagram of a publisher supporting the data format of the present invention.

The Jammer data format is useful in a variety of computer environments having data storage. In a preferred embodiment, a publisher stores object data in a data repository in various formats including the Jammer data format. As shown in FIG. 11, a publisher 210 includes a stream configurator 212, a template 214, an interleavor 216 and a data definition generator 218. The stream configurator 212 parses through a page stored in a content storage 213 to identify references to objects and their locations within the page. Content storage 213 includes objects having a variety of object data types, such as HTML, JPEG, WAV, GIF and BMP data. The stream configurator 212 also receives information about the objects, such as the sequence in which the objects comprising the page are to be displayed, and produces a stream configuration template 214. The following pseudo-code illustrates an implementation of a template 214 of the present invention:

Function MakeStreamConfigurationTemplate (InputFileName)
    'The InputFileName is the name of the HTML or other file that contains
    'references to the other files.

'This routine creates the Stream Configuration Template. Each record has the
    'following data:
    'ObjName—the name of the object
    'ObjNum—the object number (the first object is 1, the second 2, etc.)
    'ObjParent—the object number of the object that references this object.
    'ObjOffset—the number of bytes from the start of the parent object at
        'which the reference occurred.
    'User supplied display sequence information. This provides information
        'to the Interleavor for the order in which to display the objects.
    Write a record for the Input File to the template file.
        Set ObjName to InputFile,
        Set ObjNum to 1,
        Set ObjParent to 0 (since this is the root object),
        Set ObjOffset to 0.
    'This first record is for the main object (i.e. the HTML file) that includes
    'references to the other objects.

'Set ObjectCount to 2
    Read the HTML file, and find all of the references to objects, such as gifs, Java Applets,
    ActiveX controls that it contains.
    For each object that you find
        Write a record for the object to the template file.
        Set ObjName to URL of the object,
        Set ObjNum to ObjectCount,
        Set ObjParent to 1,
        Set ObjOffset to the offset in bytes that the reference was found in the HTML file.
        Write Display ordering information
    Set ObjectCount=ObjectCount+1
End A skilled artisan may modify the template 214 pseudo-code to accommodate nested objects. For example, in the template 214, objects referenced by another object, a parent object, appear after the parent object. The ObjParent field of the referenced object is set to the object number of the parent object. In addition, the ObjOffset field of the referenced object is then set to the value of the offset in the parent object for which the reference was found.

A data definition generator 216 interprets the stream configuration template 214 to create a data definition entry for each object included in the data stream 190. An interleavor 218 also interprets the stream configuration template 214 to produce a data stream 190 by interleaving data definition entries provided by the data definition generator 216 with object data provided by content storage 219. The interleavor 218 uses the display sequence information to determine how to interleave the object data in the data stream 190 so as to ensure that the data definition entry for each object precedes any of its object data packets in the data stream 190. Thus, the interleavor 218 writes object data into the data stream 190 for those objects having a lower sequence number prior to the object data for those objects having a higher sequence number. The following pseudo-code illustrates an implementation of a publisher 210 of the present invention:

```
Function                    MakeJammedStream
    (StreamConfigurationTemplate)
  'This function takes as input a Stream Configuration
    Template. It reads in the
  'various data files that template references (HTML, GIF,
    etc.) and produces the
  'Jammed interleaved file.

'This routine reads records from the Stream Configuration
    Template.
  'Each record has the following data:
    'ObjName—the name of the object
    'ObjNum—the object number (the first object is 1, the
      second 2, etc.)
    'ObjParent—the object number of the object that ref-
      erences this object.
    'ObjOffset—the number of bytes from the start of the
      parent object at which
      'the reference occurred.
    'User supplied display sequence information. This pro-
      vides information
      'to the Interleavor for the order in which to display
      the objects.
  Set countOfBytesWritten to 0
  'The countOfBytesWritten is the counter of how many
    bytes of the HTML file have
  'been written to the Jammed File. The reason that we need
    this, is that we must
  'write a data definition entry for a referenced object
    before we write the reference to
  'that object in the HTML file. Since each record in the
    configuration template has
  'the offset in the file of where the reference appears, and
    the records are in the
  'order that they appeared in the HTML file, as we read
    each record, we can compare
  'the offset with how much of the parent has been written.
    In this way, we can
  'optimize when we write the data definition entries to the
    stream. Note that to support
  'nested objects, that is objects whose ObjParent is greater
    than 1, we would need
  'to maintain counters of how much of each of the parent
    objects had been written.
  Read the first record from the StreamConfigurationTem-
    plate
  Call the DataDefinitionGenerator to create a data defini-
    tion entry for the first record.

Add the first record to the activeObjectsList
  'the activeObjectsList is the list of objects for which data
    definition entries have
  'already been written to the stream, and for which we are
    currently writing data
  'packets.
  While there are still records in the StreamConfiguration-
    Template
    Read a record from the template, and set it to curren-
      tRecord.
    If countOfBytesWritten is less than currentRecord.Ob-
      jOffset
    While countOfBytesWritten is less than currentRecor-
      d.ObjOffset
      Write out data packets for each object in the acti-
        veObjectsList.
        If we write out data from the first object, add the
          bytes written to countOfBytesWritten
        if we finish writing data for any of the objects,
          remove them from the activeObjectsList
      end While
    end if
    Call the DataDefinitionGenerator to create a data defi-
      nition entry for currentRecord.
    Add currentRecord to the activeObjectsList before all
      objects with a lower priority as determined by the
      user supplied ordering information.
  end While
  While activeObjectsList contains 1 or more objects
    Write out data packets for each object in the activeO-
      bjectsList.
    if we finish writing data for any of the objects, remove
      them from the activeObjectsList
  end While
End
```

Figure 12:
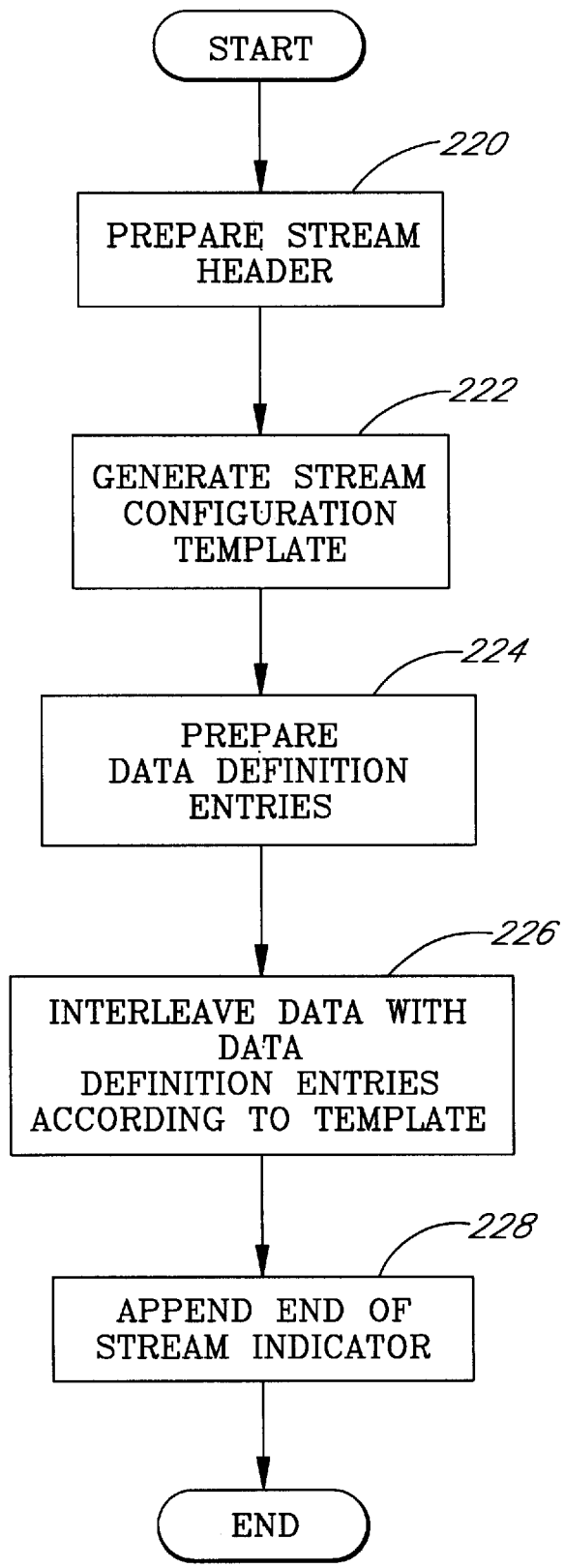
FIG. 12 is a flowchart illustrating the process flow of a publisher of the present invention.

Reference is now principally made to FIGS. 8, 11 and 12 which illustrate the process flow of the publisher 210 (FIG. 11) of the present invention. At state 220, the publisher 210 prepares a stream header 180 to indicate that the data to follow is prepared using the data format of the present invention. The publisher 210 proceeds to state 222 where it generates a stream configuration template 214 including information regarding objects defined by a page, their locations on the page and their sequence of display. At state 224, the publisher 210 prepares data definition entries 192 (FIG. 9) for each object defined by the page. Note that the publisher 210 may generate the template 214 and prepare the data definition entries 192 (FIG. 9) concurrently. At state 226, the publisher 210 interleaves object data packets 200 (FIG. 10) with data definition entries 192 (FIG. 9) according to the sequence defined by the stream configuration template 214 so as to form a data stream 190. Lastly, the publisher 210 appends an end of stream indicator 191 to indicate the end of the data stream 190.

FIG. 13 illustrates the structure of a browser 230 of one embodiment of the present invention. In contrast to prior art browsers, the browser 230 of the present invention supports data transfer using the data format of the present invention as well as those of standard TCP and HTTP protocols. The browser 230 includes an unpacker 232 to receive an incoming data stream, such as the data stream 190 (FIG. 8), from a server 106 (FIG. 1a). The unpacker 232 communicates with an unpacked object cache (UOC) 234 to store object data received in the Jammer data format. In addition, the unpacker 232 may communicate with a browser cache 235 to store received object data that is not encoded in the Jammer data format. The browser cache 235 operates in the conventional manner of prior art browsers, such as Microsoft Internet Explorer and Netscape Navigator, which is well known. The unpacker 232 identifies the data type of an object in the data stream 190 and invokes a data handler 236 to interpret the object data. The data handler 236 is capable of interpreting a wide variety of data types, such as HTML, GIF, JPEG, WAV, ActiveX and Java applets. The data handler 236 in turn passes the interpreted object data to an object renderer 238 to render on a display 239 for viewing.

Figure 14:
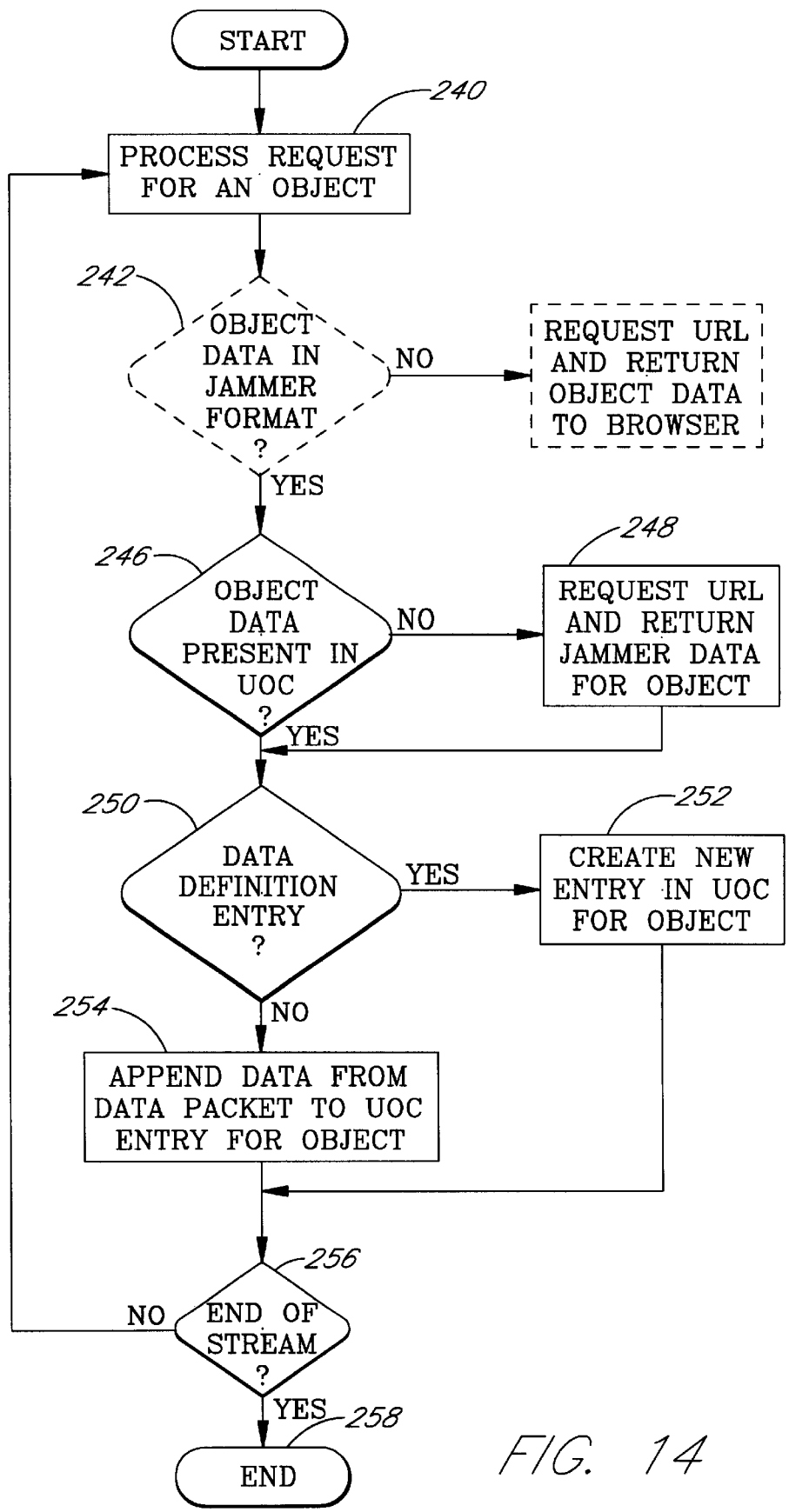
FIG. 14 is a flowchart illustrating the process flow of a browser unpacking a data stream encoded in the data format of the present invention.

In conjunction with FIG. 13, FIG. 14 illustrates the process by which a browser 230 (FIG. 13) unpacks a data stream 190 (FIG. 8) encoded in the data format of the present invention. At state 240, the unpacker 232 of the browser 230 processes a request for an object. For example, when the user points and clicks on a hyperlinked object on a Web page, the browser 230 issues a request, such as a URL, for the object. At state 242, the unpacker 232 may determine if the requested object data is in the Jammer format. If not, then the unpacker 232 issues a request to the server 106 (FIG. 1a) at state 244 to return the object data in the conventional format of the prior art. Otherwise, at state 246, the unpacker 232 checks the UOC 234 to determine if the requested object is present. If the object is not present in the UOC 234, the unpacker 232 proceeds to state 248 to issue a request to the server 106 (FIG. 1a) to return the requested object data in the Jammer format. Otherwise, the UOC 234 returns the requested object. The unpacker 232 proceeds to state 250 to determine if the returned data is a data definition entry 192 (FIG. 9). If a data definition entry 192 (FIG. 9) is found, the unpacker 232 proceeds to state 252 to create an entry in the UOC 234 for the object corresponding to the data definition entry 192 (FIG. 9). Otherwise, an object data packet 200 (FIG. 10) is encountered and the unpacker 232 proceeds to state 254 where it appends data from the data packet 200 (FIG. 10) to the entry in the UOC 234 corresponding to the object and forwards the data to the browser if it has been previously requested. Lastly, the browser 230 proceeds to state 256 where it checks for the end of stream indicator 191 (FIG. 8). If the indicator is found, the process terminates at state 258. Otherwise, the process continues at state 240.

Now referring principally to FIG. 13, when the unpacker 232 receives a data stream 190 (FIG. 8), it examines the stream header 180 (FIG. 8) to determine if the data is encoded in the Jammer data format. If the data is encoded in the Jammer data format, the unpacker 232 proceeds to the first data definition entry, which identifies the base object. Since the base object is the object that the browser 230 initially requested, an entry is created for this object in the UOC 234 and data packets for this object will be sent to the browser. When the browser 230 encounters a reference to another object, it makes a request to the unpacker 232 for the object. Because a data definition entry for an object must precede any references to the object in the data stream 190 (FIG. 8), when the unpacker 232 searches the UOC 234, the object has an entry in the UOC 234, which returns the found object to the browser 230 immediately. Otherwise, the unpacker 232 searches the browser cache 235 to locate the requested object. If the unpacker 232 is unable to locate the requested object within the UOC 234 or the browser cache 235, the unpacker 232 requests the object from the server. The following pseudo-code illustrates an implementation of an unpacker 232 of the present invention:

Function GetObject(URL objName)
  'This function is what the Browser calls when it wants to get a particular URL. It is 'implemented by the Unpacker. It returns the data for the object specified by the URL 'objName.
  Check the UOC to see if an entry already exists for this URL.
  If URL is present in UOC
    return the object from the UOC
  else if cacheManager has URL
    return the object from the cache
  else
  contact remote host specified in URL, and request object.
    if host reports error
      return error code
      else if object is not jammer encoded format
      return object to browser
    else
    'At this point, we have obtained the object from the server, and it is encoded in the 'Jammer Encoded Format.
    Get first record from stream
    if record.type is not data definition entry
      end connection to server
      return error code
    else
      create new entry for object in UOC
    While GetNextRecordFromStream returns success
      if record.type is a data definition entry
        add to UOC
      if record.type is a data packet
        find the corresponding entry in the UOC, and append the data to the object.
        if object is currently being read from the UOC by the browser send this data to browser
      end if
    end While
    end else
end Function GetObject In another embodiment of the present invention, the unpacker resides on a web server proxy in communication with the browser 168 (FIG. 6) and with the server 169 (FIG. 6). In this embodiment, the web server proxy intercepts communications between the browser 168 and the server 169. The web server proxy includes an unpacker and an unpacker object cache. In a similar fashion, the unpacker examines the stream header 180 (FIG. 8) to determine if the data stream 190 (FIG. 8) from the server 169 is encoded in the Jammer data format. If so, the unpacker of the web server proxy unpacks the data stream 190 (FIG. 8) as described above and forwards the unpacked data to the browser 168. In this manner, the data format of the present invention may be used with a conventional browser 168 of the prior art.

Referring back to FIG. 1a, in another preferred embodiment, the data repository comprises a server 106 linked to the World Wide Web 104 portion of the Internet. The server 106 communicates with storage devices for holding object data. These storage devices may communicate directly or indirectly with the server and may reside separately, on the server computer itself, within other servers communicating with the server or among a plurality of computers linked to the Internet. Storage devices include magnetic disk drives, electronic memory, optical disk drives, magnetic tape and other devices used to stored data. The browser comprises a client 102 having a viewing device and the browser communicates with the server 106 through the World Wide Web 104. Viewing devices for the client 102 include CRT monitors, flat panel displays, projection displays and other display devices. In one sense, a server 106 is any device capable of locating, storing, retrieving and transferring object data and a client 102 is any device capable of requesting, receiving and displaying object data. Servers and clients can be stationary or mobile and may communicate using conventional land lines or wireless technologies, such as satellite, cellular or infrared.

In yet another preferred embodiment, the data repository comprises a server 106 linked to an intranet 104. The intranet 104 functions in a manner similar to that of the World Wide Web. However, for security reasons, the intranet 104 is not connected to the Internet. The server 106 communicates with storage devices for holding object data. These storage devices may communicate directly or indirectly with the server and may reside separately, on the server itself, within other servers communicating with the server or among a plurality of computers linked to the intranet. Storage devices include magnetic disk drives, electronic memory, optical disk drives, magnetic tape and other devices used to store data. The browser comprises a client 102 having a viewing device and the browser communicates with the server 106 through the intranet 104. Viewing devices for the client 102 include CRT monitors, flat panel displays, projection displays and other display devices. In one sense, a server 106 is any device capable of locating, storing, retrieving and transferring object data and a client 102 is any device capable of requesting, receiving and displaying object data. Servers and clients can be stationary or mobile and may communicate using conventional land lines or wireless technologies, such as satellite, cellular or infrared.

In yet another preferred embodiment, the data repository comprises a network server 107 linked to a wide area network 108 or to a local area network 109. The network server 107 communicates with storage devices for holding object data. These storage devices may communicate directly or indirectly with the network server and may reside separately, on the network server itself, within other network servers communicating with the network server or among a plurality of computers linked to the wide or local area network. Storage devices include magnetic disk drives, electronic memory, optical disk drives, magnetic tape and other devices used to store data. The browser comprises a network client 103 having a viewing device and the browser communicates with the network server 107 through the wide area 108 or the local area network 109. Viewing devices for the network client 103 include CRT monitors, flat panel displays, projection displays and other display devices. As is well known in the art, network servers 107 and clients 103 are typically computing devices linked into a network using specialized software for communication and data transfer, such as Microsoft Windows NT or Novell Netware. Network servers 107 and clients 103 can be stationary or mobile and may communicate using conventional land lines or wireless technologies, such as satellite, cellular or infrared.

In yet another preferred embodiment, the data repository comprises a storage device 105 (FIG. 1*a*) communicating with a user computer 102. These storage devices may reside separately or within the user computer. Storage devices include magnetic disk drives, electronic memory, optical disk drives such as CD-ROMs, magnetic tape and other devices used to store data. The browser resides on the user computer 102 having a viewing device and the browser communicates with the storage device 105 through the user computer's processor. Viewing devices for the user computer 102 include CRT monitors, flat panel displays, projection displays and other display devices.

IV. Summary

The data format of the present invention advantageously overcomes important limitations of available and anticipated alternatives. The present invention substantially reduces the impact of latency on object retrieval by reducing the number of get and retrieve transactions to one. Although planned HTTP improvements enable multiple transactions per connection, the protocol extension does not reduce the number of transactions required to get multiple objects needed to display a multimedia page. Similarly, server push, a technique of enabling a server to interpret the HTML base object to find embedded objects, may reduce latency, but again does not reduce the number of transactions needed to transfer and display the page. Instead, server push merely transfers the burden of multiple object retrieval from the browser to the server. Moreover, server push does not permit an author to optimize the sequence of object data transfers. Another proposed alternative, multi-part MIME, permits assembly of multiple objects into a single data stream. However, in contrast to the present invention, multi-part MIME does not permit interleaving of object data, nor does it permit optimization of how objects and object parts are delivered, in a predetermined order.

Moreover, the data format of the present invention advantageously reduces server loading by eliminating the need for superfluous transactions. For example, a page having 15 objects currently requires 15 transactions to transfer. Thus, a server capable of handling 150 transactions/second can only deliver 10 pages/sec. In contrast, the present invention typically results in the transfer of a single larger data stream and this may degrade server performance slightly. Thus, even if the server is only capable of handling 100 transactions/second using the data format of the present invention, it can still deliver 100 pages/sec. Hence, a user practicing the present invention realizes a tenfold improvement over existing techniques.

Those skilled in the art may practice the principles of the present invention in other specific forms without departing from its spirit or essential characteristics. Accordingly, the disclosed embodiments of the invention are merely illustrative and do not serve to limit the scope of the invention set forth in the following claims.

What is claimed is:

1. In a computer environment, a publisher for storing and transmitting a stream of objects, each object in the stream having object data packets, comprising:

a stream configurator producing a template providing an order in which to display each of the objects in the stream;

a data definition generator providing at least one data definition entry corresponding to each object in the template; and an interleavor assembling the stream by interleaving the object data packets and the data definition entries according to the order provided in the template, wherein the at least one data definition entry is interleaved with the object data packets such that the data definition entry corresponding to one of the objects in the stream precedes any object data packets of the one object in the stream.

2. The publisher of claim 1, wherein the data definition entry corresponding to the one object in the stream precedes any reference to the one object from any other object in the stream.

3. The publisher of claim 1, wherein the object data packets comprise HTML data.

4. The publisher of claim 1, wherein the object data packets comprise JPEG data.

5. The publisher of claim 1, wherein the object data packets comprise GIF data.

6. The publisher of claim 1, wherein the object data packets comprise WAV data.

7. The publisher of claim 1, wherein the object data packets comprise BMP data.

8. The publisher of claim 1, wherein the object data packets comprise ActiveX data.

9. The publisher of claim 1, wherein the object data packets comprise Java data.

10. In a computer environment, a browser for displaying an image on a display, the image represented by a stream of objects, each object in the stream having object data packets, comprising:
    an unpacker receiving the stream, the stream having data definition entries interleaved with object data packets, the unpacker extracting the object data packets from the stream with reference to the data definition entries;
    an unpacker object cache (UOC) storing object data packets provided by the unpacker, the UOC organizing the object data packets according to the corresponding data definition entry for each object in the stream; and
    at least one data handler interpreting object data packets selected by the unpacker so that the interpreted object data packets can be rendered on the display.

11. The browser of claim 10, wherein the data definition entries are interleaved with the object data packets such that the data definition entry corresponding to one of the objects in the stream precedes any object data packets of the one object in the stream.

12. The browser of claim 11, wherein the data definition entry corresponding to the one object in the stream precedes any reference to the one object from any other object in the stream.

13. The browser of claim 10, wherein the at least one data handler interprets HTML object data packets.

14. The browser of claim 10, wherein the at least one data handler interprets JPEG object data packets.

15. The browser of claim 10, wherein the at least one data handler interprets GIF object data packets.

16. The browser of claim 10, wherein the at least one data handler interprets WAV object data packets.

17. The browser of claim 10, wherein the at least one data handler interprets BMP object data packets.

18. The browser of claim 10, wherein the at least one data handler interprets ActiveX object data packets.

19. The browser of claim 10, wherein the at least one data handler interprets Java object data packets.

20. In a computer environment, a method of forming a stream from a page having a plurality of objects, each object having object data packets, comprising the steps of:
    creating data definition entries corresponding to the objects in the page; and
    interleaving the data definition entries with the object data packets so as to form the stream, wherein the data definition entry corresponding to one of the objects in the page precedes any object data packets of the one object.

21. The method of claim 20, further comprising the step of transmitting the stream to a browser.

22. The method of claim 20, further comprising the step of storing the stream in a data repository.

23. The method of claim 20, further comprising the step of generating a template to define a display sequence, wherein the step of interleaving said data definition entries comprises interleaving said data definition entries with said object data packets so as to display objects in the stream according to the display sequence of the template.

24. The method of claim 20, further comprising the step of creating a stream header for placement at the beginning of the stream.

25. The method of claim 20, further comprising the step of appending an end of stream indicator at the end of the stream.

26. The method of claim 20, wherein the page is an HTML page.

27. In a computer environment, a method of displaying a page having a plurality of objects, each object having object data packets, comprising the steps of:
    receiving a stream having data definition entries interleaved with object data packets corresponding to each of the plurality of objects;
    unpacking said object data packets from said stream with reference to said data definition entries; and displaying data representing said object data packets on a viewing device.

28. The method of claim 27, wherein said step of unpacking said object data packets comprises retrieving object data from an unpacker object cache.

29. The method of claim 27, wherein said step of displaying data representing said object data packets further comprises:
    selecting a data handler to interpret the object data; and
    displaying the interpreted object data on a viewing device.

30. The method of claim 27, wherein said step of displaying data representing said object data packets comprises displaying data representing said object data packets for more than one object simultaneously.

31. The method of claim 27, wherein the page is an HTML page.

32. A computer-readable medium having computer-executable modules for generating a user-specified data stream having object data packets, wherein the object data packets are stored in content storage, comprising:
    a stream configurator module for receiving object data packets and user input and for creating a template as a function of the object data packets and the user input;
    a data definition generator module for generating data as a function of each object data packet and responsive to the template; and
    an interleavor module for generating a data stream as a function of the template, object data packets, and the data definition generator module.

33. The computer-readable medium of claim 32 wherein the stream configurator module receives object data packets having a format selected from the group consisting of HTML data, JPEG data, GIF data, WAV data, BMP data, ActiveX data and Java data.

34. The computer-readable medium of claim 32 wherein the stream configurator module receives object data packets stored in content storage.

35. The computer-readable medium of claim 32 wherein the stream configurator module parses a page of data stored in content storage.

36. The computer-readable medium of claim 32 wherein the stream configurator module receives data representative of the sequence of display.

37. The computer-readable medium of claim 32 wherein the data definition generator module interprets the template.

38. The computer-readable medium of claim 32 wherein the data definition generator module generates information about each object data packet.

39. The computer-readable medium of claim 32 wherein the data definition generator module generates an object data packet identifier for an object data packet.

40. The computer-readable medium of claim 32 wherein the data definition generator module generates a stream identifier number for an object data packet.

41. The computer-readable medium of claim 32 wherein the data definition generator module generates information representative of the size of an object data packet.

42. The computer-readable medium of claim 32 wherein the interleavor module interprets the template.

43. The computer-readable medium of claim 32 wherein the interleavor module interleaves data definition entries with object data packets.

44. The computer-readable medium of claim 32 wherein the interleavor module arranges data definition entries adjacent to object data packets.

45. The computer-readable medium of claim 32 wherein the interleavor module arranges data definition entries prior to object data packets.

46. A computer-readable medium stored thereon for causing a computer to perform a method comprising:
   receiving user input;
   receiving one or more object data packets;
   generating a template as a function of the user input and the one or more object data packets;
   generating a data definition packet for each object data packet wherein each data definition packet corresponds to, and is a function of, an object data packet; and
   interleaving as a function of the template, each data definition packet with a corresponding object data packet, wherein each data definition packet precedes the corresponding object data packet.

47. The computer-readable medium of claim 46 wherein receiving user input includes receiving information relative to sequencing of object data packets in the data stream.

48. The computer-readable medium of claim 46 wherein receiving user input includes selecting object data packets for inclusion in the data stream.

49. The computer-readable medium of claim 46 wherein receiving one or more object data packets includes accessing content storage.

50. The computer-readable medium of claim 46 wherein generating a template includes specifying the sequence of object data packets in the data stream.

51. The computer-readable medium of claim 46 wherein generating a data definition packet includes accessing an object data packet.

52. The computer-readable medium of claim 46 wherein generating a data definition packet includes generating an object data packet identifier.

53. The computer-readable medium of claim 46 wherein generating a data definition packet includes generating a stream identifier.

54. The computer-readable medium of claim 46 wherein generating a data definition packet includes generating information representative of the size of the object data packet.

55. The computer-readable medium of claim 46 wherein interleaving includes arranging a data definition packet adjacent to the corresponding object data packet.

56. The computer-readable medium of claim 46 wherein interleaving includes accessing the template and arranging, in alternating sequence, data definition packets and corresponding object data packets.

57. The computer-readable medium of claim 46 including the step of preparing a stream header.

58. The computer-readable medium of claim 46 including the step of appending an end of stream indicator.

59. In a computer environment, a publisher for storing and transmitting a stream of objects, each object in the stream having object data packets, comprising:
   a stream configurator producing a template providing an order in which to display each of the objects in the stream;
   a data definition generator providing at least one data definition entry corresponding to each object in the template, each data definition entry comprising an object identifier and a stream identifier; and
   an interleavor assembling the stream by interleaving the object data packets and the data definition entries according to the order provided in the template, wherein the at least one data definition entry is interleaved with the object data packets such that the data definition entry corresponding to one of the objects in the stream precedes any object data packets of the one object in the stream.

60. The publisher of claim 59, wherein the data definition entry corresponding to the one object in the stream precedes any reference to the one object from any other object in the stream.

61. A computer-readable medium having instructions stored thereon for generating a user-specified data stream having object data packets, wherein the object data packets are stored in content storage, the computer-readable medium comprising:
   a stream configurator module for receiving object data packets and user input and for creating a template as a function of the object data packets and the user input;
   a data definition generator module for generating data as a function of each object data packet and responsive to the template, each data comprising an object identifier and a stream identifier; and
   an interleavor module for generating a stream as a function of the template, object data packets and the data definition generator module.

62. The computer-readable medium of claim 61 wherein the data definition generator module interprets the template.

63. The computer-readable medium of claim 61 wherein the data definition generator module generates information about each object data packet.

64. The computer-readable medium of claim 61 wherein the data definition generator module generates an object data packet identifier for an object data packet.

65. The computer-readable medium of claim 61 wherein the data definition generator module generates a stream identifier number for an object data packet.

66. The computer-readable medium of claim 61 wherein the data definition generator module generates information representative of the size of an object data packet.

67. The computer-readable medium of claim 61 wherein the interleavor module interprets the template.

68. The computer-readable medium of claim 61 wherein the interleavor module interleaves data definition entries with object data packets.

69. The computer-readable medium of claim 61 wherein the interleavor module arranges data definition entries adjacent to object data packets.

70. The computer-readable medium of claim 61 wherein the interleavor module arranges data definition entries prior to object data packets.

71. A computer-readable medium having computer-executable instructions for generating a data stream, the method comprising:

receiving user input;

receiving one or more object data packets;

generating a template as a function of the user input and the one or more object data packets;

generating a data definition packet for each object data packet wherein each data definition packet corresponds to, and is a function of, an object data packet; and interleaving as a function of the template, each data definition packet with a corresponding object data packet, wherein each data definition packet precedes the corresponding object data packet.

72. The computer-readable medium of claim 69 wherein generating a data definition packet includes accessing an object data packet.

73. The computer-readable medium of claim 69 wherein generating a data definition packet includes generating an object data packet identifier.

74. The computer-readable medium of claim 69 wherein generating a data definition packet includes generating a stream identifier.

75. The computer-readable medium of claim 69 wherein generating a data definition packet includes generating information representative of the size of the object data packet.

76. The computer-readable medium of claim 69 wherein interleaving includes arranging a data definition packet adjacent to the corresponding object data packet.

77. The computer-readable medium of claim 69 wherein interleaving includes accessing the template and arranging, in alternating sequence, data definition packets and corresponding object data packets.

78. The computer-readable medium of claim 69 including preparing a stream header.

79. A computer-readable medium instructions stored thereon for causing a computer to perform a method comprising:

receiving user input;

receiving one or more object data packets;

generating a template as a function of the user input and the one or more object data packets;

generating a data definition packet for each object data packet wherein each data definition packet corresponds to, and is a function of, an object data packet;

interleaving as a function of the template, each data definition packet with a corresponding object data packet, wherein each data definition packet precedes the corresponding object data packet; and transmitting each data definition packet with a corresponding object data packet.

80. In a computer environment, a publisher for storing and transmitting a stream of objects, each object in the stream having object data packets, comprising:

a stream configurator parsing to identify objects or receiving data about objects and producing a template based on the parsed or received data, wherein the template provides an order in which to display each of the objects in the stream;

a data definition generator providing at least one data definition entry corresponding to each object in the template; and an interleavor assembling the stream by interleaving the object data packets and the data definition entries according to the order provided in the template, wherein the at least one definition entry is interleaved with the object data packets such that the data definition entry corresponding to one of the objects in the stream precedes any object data packets of the one object in the stream.

81. A computer-readable medium having computer-executable modules for generating a user-specified data stream having object data packets, wherein the object data packets are stored in content storage, comprising:

a stream configurator module for parsing and receiving object data packets and user input and for creating a template as a function of the object data packets and the user input;

a data definition generator module for generating data as a function of each object data packet and responsive to the template; and an interleavor module for generating a data stream as a function of the template, object data packets, and the data definition generator module.

82. A computer-readable medium stored thereon for causing a computer to perform a method comprising:

receiving user input;

parsing and receiving one or more object data packets;

generating a template as a function of the user input and the one or more object data packets;

generating a data definition packet for each object data packet wherein each data definition packet corresponds to, and is a function of, an object data packet; and interleaving as a function of the template, each data definition packet with a corresponding object data packet, wherein each data definition packet precedes the corresponding object data packet.

83. In a computer environment, a publisher for storing and transmitting a stream of objects, each object in the stream having object data packets, comprising:

a stream configurator parsing to identify objects or receiving data about objects and producing a template based on the parsed or received data, wherein the template provides an order in which to display each of the objects in the stream;

a data definition generator providing at least one data definition entry corresponding to each object in the template, each data definition entry comprising an object identifier and a stream identifier; and an interleavor assembling the stream by interleaving the object data packets and the data definition entries according to the order provided in the template, wherein the at least one data definition entry is interleaved with the object data packets such that the data definition entry corresponding to one of the objects in the stream precedes any object data packets of the one object in the stream.

84. A computer-readable medium having instructions stored thereon for generating a user-specified data stream having object data packets, wherein the object data packets are stored in content storage, the computer-readable medium comprising:

a stream configurator module for parsing and receiving object data packets and user input and for creating a template as a function of the object data packets and the user input;

a data definition generator module for generating data as a function of each object data packet and responsive to the template, each data comprising an object identifier and a stream identifier; and an interleavor module for generating a stream as a function of the template, object data packets and the data definition generator module.

85. A computer-readable medium having computer-executable instructions for generating a data stream, the method comprising:

receiving user input;

parsing and receiving one or more object data packets;

generating a template as a function of the user input and the one or more object data packets;

generating a data definition packet for each object data packet wherein each data definition packet corresponds to, and is a function of, an object data packet; and interleaving as a function of the template, each data definition packet with a corresponding object data packet, wherein each data definition packet precedes the corresponding object data packet.

86. A computer-readable medium instructions stored thereon for causing a computer to perform a method comprising:

receiving user input;

parsing and receiving one or more object data packets;

generating a template as a function of the user input and the one or more object data packets;

generating a data definition packet for each object data packet wherein each data definition packet corresponds to, and is a function of, an object data packet;

interleaving as a function of the template, each data definition packet with a corresponding object data packet, wherein each data definition packet precedes the corresponding object data packet; and transmitting each data definition packet with a corresponding object data packet.

\* \* \* \* \*